(12) United States Patent
Shiga

(10) Patent No.: US 12,512,162 B2
(45) Date of Patent: Dec. 30, 2025

(54) NAND MEMORY WITH WORD LINE AND SWITCH TRANSISTOR VOLTAGES

(71) Applicant: Kioxia Corporation, Tokyo (JP)

(72) Inventor: Hidehiro Shiga, Yokohama (JP)

(73) Assignee: Kioxia Corporation, Tokyo (JP)

( * ) Notice: Subject to any disclaimer, the term of this patent is extended or adjusted under 35 U.S.C. 154(b) by 348 days.

(21) Appl. No.: 18/181,140

(22) Filed: Mar. 9, 2023

(65) Prior Publication Data

US 2024/0005997 A1 Jan. 4, 2024

(30) Foreign Application Priority Data

Jul. 4, 2022 (JP) .................................. 2022-107934

(51) Int. Cl.
*G11C 16/16* (2006.01)
*G11C 16/04* (2006.01)
*G11C 16/14* (2006.01)

(52) U.S. Cl.
CPC .......... *G11C 16/16* (2013.01); *G11C 16/0483* (2013.01); *G11C 16/14* (2013.01); *G11C 2211/5648* (2013.01)

(58) Field of Classification Search
CPC ..... G11C 16/16; G11C 16/0483; G11C 16/14; G11C 2211/5648; G11C 16/30; G11C 16/08; G11C 16/32
See application file for complete search history.

(56) References Cited

U.S. PATENT DOCUMENTS

| | | | |
|---|---|---|---|
| 2014/0247671 A1* | 9/2014 | Ito ...................... | G11C 16/0483 365/185.23 |
| 2016/0260489 A1* | 9/2016 | Lee ..................... | G11C 16/3427 |
| 2017/0262229 A1 | 9/2017 | Ochi et al. | |
| 2019/0279719 A1* | 9/2019 | Lee ......................... | G11C 16/32 |
| 2020/0043549 A1* | 2/2020 | Shibata .................. | G11C 16/32 |
| 2020/0202964 A1 | 6/2020 | Sako | |
| 2023/0093270 A1 | 3/2023 | Li | |

FOREIGN PATENT DOCUMENTS

| | | |
|---|---|---|
| JP | 2017-168160 A | 9/2017 |
| JP | 2020-24774 A | 2/2020 |
| JP | 2020-102287 A | 7/2020 |

* cited by examiner

*Primary Examiner* — Donald H B Braswell
(74) *Attorney, Agent, or Firm* — Oblon, McClelland, Maier & Neustadt, L.L.P.

(57) ABSTRACT

Disclosed herein are related to a memory device and a method of operating the memory device. In one aspect, a voltage supply circuit is configured to apply, during a first time period, a first voltage to a gate of a first switch transistor connected to a first block of memory cells through a first word line to enable the first switch transistor. In one aspect, the voltage supply circuit is configured to apply, during the first time period, a second voltage lower than the first voltage to the first word line through the first switch transistor. In one aspect, the voltage supply circuit is configured to apply, during the first time period, a third voltage lower than the second voltage to a gate of a second switch transistor connected to a second block of memory cells through a second word line to disable the second switch transistor.

17 Claims, 13 Drawing Sheets

NAND MEMORY WITH WORD LINE AND SWITCH TRANSISTOR VOLTAGES

CROSS-REFERENCE TO RELATED APPLICATION

This application claims priority to and the benefit of Japanese Patent Application No. 2022-107934 filed on Jul. 4, 2022, which is incorporated herein by reference in its entirety.

FIELD

Embodiments described herein relate generally to a semiconductor storage device.

BACKGROUND

A NAND flash memory is known as a semiconductor storage device.

DETAILED DESCRIPTION

Figure 1:
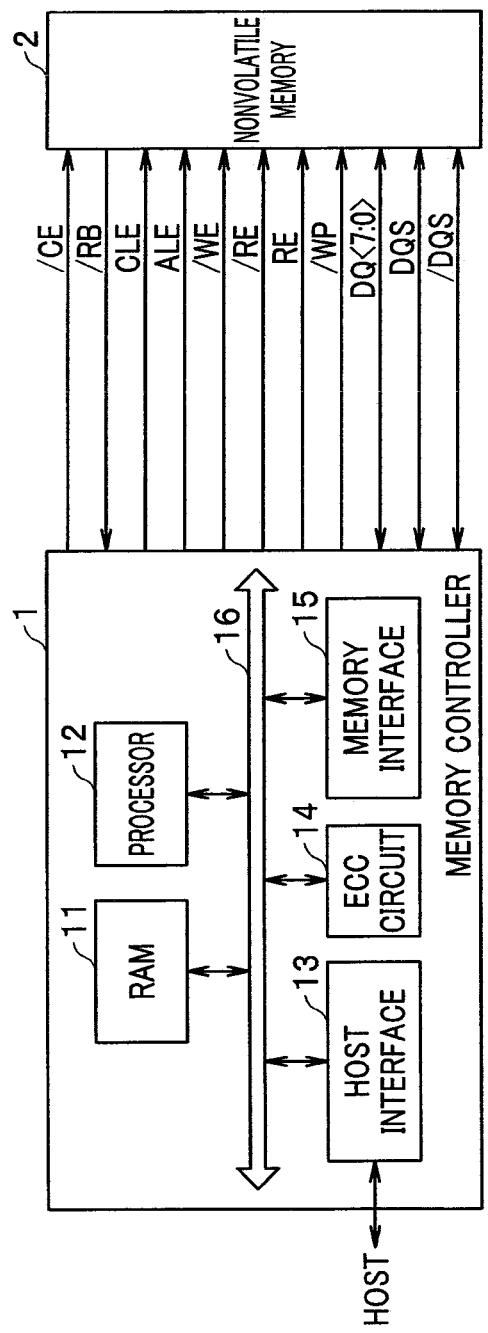
FIG. 1 is a block diagram showing a configuration example of a memory system, according to some embodiments.

Disclosed herein are related to a semiconductor storage device. In some embodiment, a semiconductor storage device includes a first block including a plurality of first memory cells, a second block including a plurality of second memory cells, a first word line connected in common to gates of the first memory cells, a second word line connected in common to gates of the second memory cells, a bit line electrically connected to one ends of the first memory cells and one ends of the second memory cells, a first signal line electrically connectable to the first word line and the second word line, a first transistor connected between the first signal line and the first word line, a second transistor connected between the first signal line and the second word line, and a voltage generation circuit configured to generate a voltage to be supplied to the first signal line, a voltage to be supplied to a gate of the first transistor, and a voltage to be supplied to a gate of the second transistor. In some embodiments, the voltage generation circuit supplies a negative voltage to the gate of the second transistor to perform an erase operation for the first memory cells.

Disclosed herein are related to a device for storing data. In some embodiments, the device includes a first block of memory cells and a second block of memory cells. In some embodiments, the device includes a first word line connected to gates of the first block of memory cells, and a second word line connected to gates of the second block of memory cells. In some embodiments, the device includes a first switch transistor connected to the first word line, and a second switch transistor connected to the second word line. In some embodiments, the device includes a voltage supply circuit connected to the first switch transistor and the second switch transistor. In some embodiments, the voltage supply circuit is configured to apply, during a first time period, a first voltage to a gate of the first switch transistor to enable the first switch transistor. In some embodiments, the voltage supply circuit is configured to apply, during the first time period, a second voltage lower than the first voltage to the first word line through the first switch transistor. In some embodiments, the voltage supply circuit is configured to apply, during the first time period, a third voltage lower than the second voltage to a gate of the second switch transistor to disable the second switch transistor. During the first time period, the second word line may be electrically floated to have a fourth voltage higher than the second voltage.

In some embodiments, the voltage supply circuit is configured to apply, during the first time period, i) the first voltage to the gate of the first switch transistor, and ii) the second voltage to the first word line, to erase data stored by the first block of memory cells. In some embodiments, data stored by the second block of memory cells is not erased during the first time period. The third voltage may be a negative voltage lower than a ground voltage. The second voltage may be the ground voltage or another negative voltage lower than the ground voltage.

1. Configuration

1-1. Configuration of Memory System

FIG. 1 is a block diagram showing a configuration example of a memory system according to some embodiments. In some embodiments, the memory system includes a memory controller 1 and a nonvolatile memory 2 as a semiconductor storage device. The memory system can be connected to a host. Examples of the host include electronic equipment such as a personal computer and a mobile terminal.

The nonvolatile memory 2 is a memory device or a component configured to store data in a nonvolatile manner, and includes a NAND memory (NAND flash memory), for example. The nonvolatile memory 2 is, for example, a NAND memory having memory cells capable of storing three bits per memory cell, for example, a 3 bit/Cell (TLC: triple level cell) NAND memory. In some examples, the nonvolatile memory 2 may be a NAND memory capable of storing one bit per cell, two bits per cell, or a plurality of bits of more than or equal to four bits per cell. In some embodiments, the nonvolatile memory 2 is embodied as one memory chip, for example. In some embodiments, the nonvolatile memory 2 may be embodied as a plurality of memory chips. The nonvolatile memory 2 may be implemented by bonding a chip including a memory cell array and a chip including another peripheral circuit, for example.

The memory controller 1 is a circuit or a component that controls writing of data into the nonvolatile memory 2 in accordance with a write request from the host. The memory controller 1 also controls reading of data from the nonvolatile memory 2 in accordance with a read request from the host. Each of a chip enable signal /CE, a ready busy signal /RB, a command latch enable signal CLE, an address latch enable signal ALE, a write enable signal /WE, read enable signals RE, /RE, a write protect signal /WP, a signal DQ<7:0> which is data, and data strobe signals DQS, /DQS can be transmitted and/or received between the memory controller 1 and the nonvolatile memory 2. A signal and a corresponding signal with "/" added may have opposite phases or opposite states with each other. In some embodiments, the memory controller 1 and the nonvolatile memory 2 may exchange more, fewer, or different signals than shown in FIG. 1.

For example, the nonvolatile memory 2 and the memory controller 1 may be each formed as a semiconductor chip (hereinafter simply called a "chip" as well).

In some embodiments, the chip enable signal /CE is a signal for selecting and enabling a particular memory chip in the nonvolatile memory 2. In some embodiments, the ready busy signal /RB is a signal for indicating whether the nonvolatile memory 2 is in a ready condition (a condition in which an external instruction from the memory controller 1 can be accepted) or in a busy condition (a condition in which an external instruction from the memory controller 1 cannot be accepted). The memory controller 1 can recognize the condition of the nonvolatile memory 2 by receiving the signal /RB. The command latch enable signal CLE is a signal indicating whether the signal DQ<7:0> is a command. The command latch enable signal CLE enables a command transmitted as the signal DQ to be latched in a command register in a selected memory chip in the nonvolatile memory 2. The address latch enable signal ALE is a signal indicating whether the signal DQ<7:0> is an address of a memory cell. The address latch enable signal ALE enables an address transmitted as the signal DQ to be latched in an address register in a selected memory chip in the nonvolatile memory 2. The write enable signal /WE is a signal for capturing a received signal into the nonvolatile memory 2. The write enable signal /WE may be asserted by the memory controller 1, when a command, an address, and data are received. The nonvolatile memory 2 may be instructed to capture the signal DQ<7:0>, while the signal /WE is in an "L (Low)" level.

The read enable signals RE, /RE are signals for the memory controller 1 to read data from the nonvolatile memory 2. The read enable signals RE, /RE are used, for example, for controlling operation timing of the nonvolatile memory 2 when outputting the signal DQ<7:0>. The write protect signal /WP is a signal for instructing prohibition of data writing and erasure to the nonvolatile memory 2. The signal DQ<7:0> may be a signal to transmit and/or receive data between the nonvolatile memory 2 and the memory controller 1. For example, the signal DQ<7:0> may include a command, an address, and/or data. The data strobe signals DQS, /DQS are signals for controlling timing of inputting/outputting the signal DQ<7:0>.

In some embodiments, the memory controller 1 includes a RAM (random access memory) 11, a processor 12, a host interface 13, an ECC (error check and correct) circuit 14, and a memory interface 15. The RAM 11, the processor 12, the host interface 13, the ECC circuit 14, and the memory interface 15 may be connected to one another with an internal bus 16. In some embodiments, the memory controller 1 includes more, fewer, or different components than shown in FIG. 1.

In some embodiments, the host interface 13 is a circuit or a component that interfaces with a host. The host interface 13 may output a request, user data (data to be written), and the like received from the host to the internal bus 16. The host interface 13 may also transmit user data read from the nonvolatile memory 2, a response from the processor 12, and the like to the host.

In some embodiments, the memory interface 15 is a circuit or a component that controls a process of writing user data and the like into the nonvolatile memory 2 and/or a process of reading user data and the like from the nonvolatile memory 2 based on instructions from the processor 12.

In some embodiments, the processor 12 circuit or a component that controls various components of the memory controller 1 in a centralized manner. The processor 12 may be a CPU (central processing unit) or an MPU (micro processing unit), for example. When a request is received from the host through the host interface 13, the processor 12 may cause or configure operations of various components of the memory controller 1, in accordance with the request. For example, the processor 12 may instruct the memory interface 15 to write user data and parity into the nonvolatile memory 2 in accordance with a request from the host. The processor 12 may also instruct the memory interface 15 to read user data and parity from the nonvolatile memory 2 in accordance with a request from the host.

In some embodiments, the processor 12 determines a storage region (memory region) on the nonvolatile memory 2 for user data stored in the RAM 11. The user data may be provided through the internal bus 16, and stored in the RAM 11. The processor 12 may determine a memory region for page unit data (page data) which is a unit of writing. User data stored in one page of the nonvolatile memory 2 may be defined as unit data. Unit data may be encoded typically by the ECC circuit 14 and stored in the nonvolatile memory 2 as a code word. In some embodiments, encoding may be bypassed. Although the memory controller 1 may store unit data in the nonvolatile memory 2 without encoding, FIG. 1 shows a configuration of performing encoding as a configuration example. When the memory controller 1 does not perform encoding, page data may match unit data. One code word may be generated based on a piece of unit data, or one code word may be generated based on divided data obtained by dividing unit data. Alternatively, one code word may be generated using a plurality of pieces of unit data.

In some embodiments, the processor 12 determines a memory region in the nonvolatile memory 2 as a write destination per unit data. A physical address may be allocated to a memory region in the nonvolatile memory 2. The processor 12 may manage the memory region as a write destination of unit data using the physical address. The processor 12 may designate the determined memory region (physical address), and instruct the memory interface 15 to write user data into the nonvolatile memory 2. The processor 12 may manage a correspondence between a logical address (logical address managed by the host) and a physical address of the user data. When a read request including a logical address is received from the host, the processor 12 may specify a physical address corresponding to the logical address, designate the physical address, and instruct the memory interface 15 to read the user data.

The ECC circuit 14 may encode user data stored in the RAM 11 to generate a code word. The ECC circuit 14 may also decode a code word read from the nonvolatile memory 2.

In some embodiments, the RAM 11 temporarily stores user data received from the host before storage in the nonvolatile memory 2, or temporarily stores data read from the nonvolatile memory 2 before transmission to the host. The RAM 11 may be embodied as a general-purpose memory such as an SRAM (static random access memory) or a DRAM (dynamic random access memory).

FIG. 1 shows a configuration example in which the memory controller 1 includes the ECC circuit 14 and the memory interface 15 individually, according to some embodiments. However, the ECC circuit 14 may be built in the memory interface 15, in some embodiments. Alternatively, the ECC circuit 14 may be built in the nonvolatile memory 2, in some embodiments.

When the write request is received from the host, the memory system may operate in the following manner. The processor 12 may cause the RAM 11 to temporarily store data targeted for writing. The processor 12 may read the data stored in the RAM 11, and provide the read data to the ECC circuit 14 as an input. The ECC circuit 14 may encode the inputted data, and provide an encoded data as a code word to the memory interface 15. The memory interface 15 may write the code word into the nonvolatile memory 2.

When the read request is received from the host, the memory system may operate in the following manner. The memory interface 15 may receive a code word from the nonvolatile memory 2, and provide the received code word to the ECC circuit 14. The ECC circuit 14 may decode the received code word, and store the decoded data in the RAM 11. The processor 12 may transmit the data stored in the RAM 11 to the host via the host interface 13.

1-2. Configuration of Nonvolatile Memory

Figure 2:
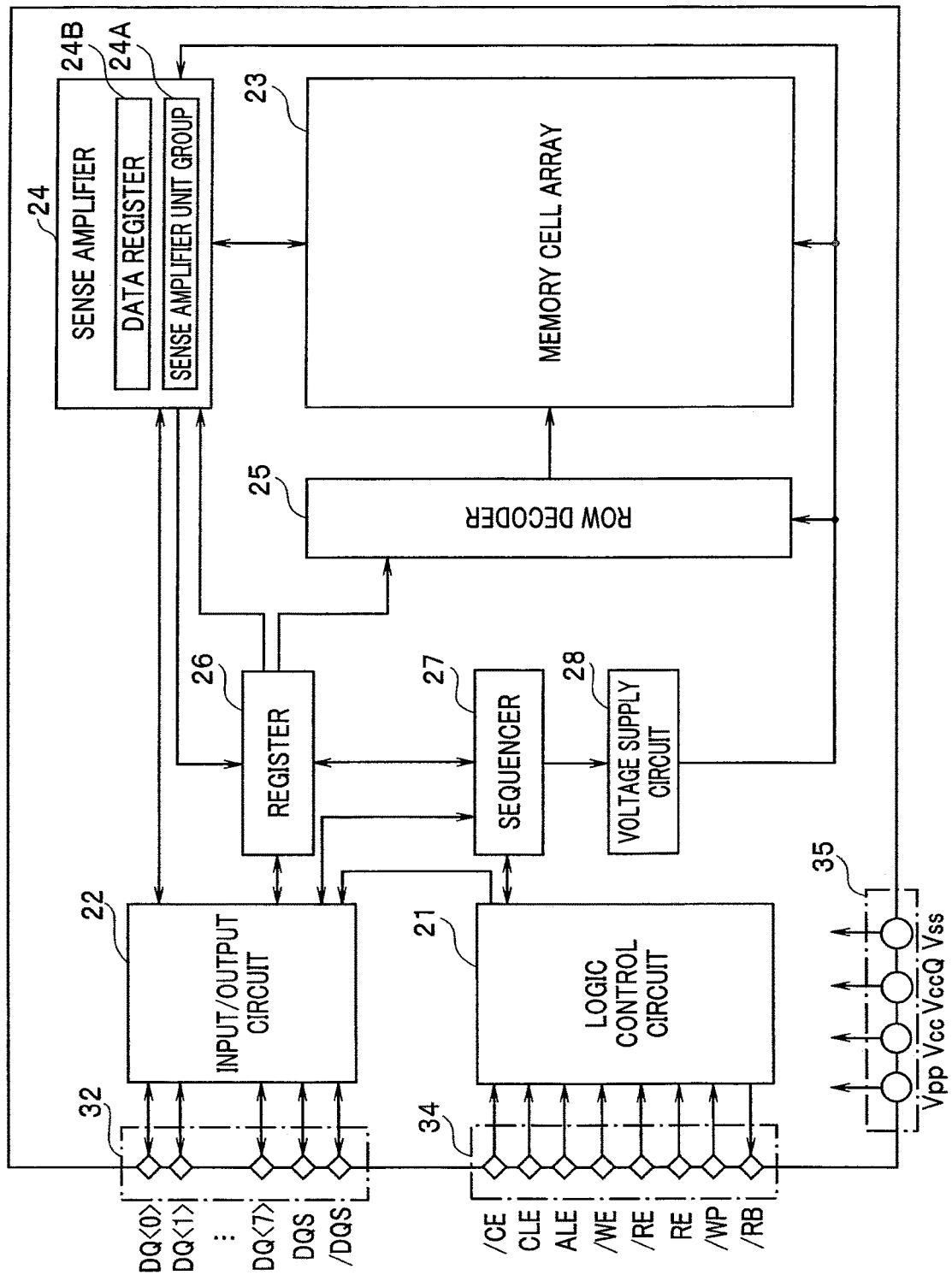
FIG. 2 is a block diagram showing a configuration example of a nonvolatile memory, according to some embodiments.

FIG. 2 is a block diagram showing a configuration example of the nonvolatile memory, according to some embodiments. In some embodiments, the nonvolatile memory 2 includes a logic control circuit 21, an input/output circuit 22, a memory cell array 23, a sense amplifier 24, a row decoder 25, a register 26, a sequencer 27, a voltage supply circuit 28, an input/output pad group 32, a logic control pad group 34, and a power source inputting terminal group 35. These components of the nonvolatile memory 2 can be implemented as a single integrated circuit, or two or more integrated circuits. In some embodiments, the nonvolatile memory 2 includes more, fewer, or different components than shown in FIG. 2.

In some embodiments, the memory cell array 23 includes a plurality of blocks. Each of the plurality of blocks BLK includes a plurality of memory cell transistors (or memory cells). A plurality of bit lines, a plurality of word lines, a source line, and the like may be disposed in the memory cell array 23 so as to control voltages to be applied to the memory cell transistors. Detailed description on one example configuration of the block BLK is described below.

In some embodiments, the input/output pad group 32 includes a plurality of terminals (pads) corresponding to the signal DQ<7:0> and the data strobe signals DQS, /DQS so as to transmit/receive the respective signals including data to/from the memory controller 1.

In some embodiments, the logic control pad group 34 includes a plurality of terminals (pads) corresponding to the chip enable signal /CE, the command latch enable signal CLE, the address latch enable signal ALE, the write enable signal /WE, the read enable signals RE, /RE, and the write protect signal /WP so as to transmit/receive the respective signals to/from the memory controller 1.

The signal /CE may enable selection of the nonvolatile memory 2. The signal CLE may enable a command transmitted as the signal DQ to be latched in the command register. The signal ALE may enable an address transmitted as the signal DQ to be latched in the address register. The signal WE may enable writing. The signal RE may enable reading. The signal WP may prohibit writing and erasure. The signal /RB may indicate that the nonvolatile memory 2 is in the ready condition (the condition in which an external instruction can be accepted) or in the busy condition (the condition in which an external instruction cannot be accepted). Thus, the memory controller 1 can recognize the condition of the nonvolatile memory 2 by receiving the signal /RB.

In some embodiments, the power source inputting terminal group 35 includes a plurality of terminals configured to input power supply voltages Vcc, VccQ, Vpp, and a ground voltage Vss in order to supply the nonvolatile memory 2 with various types of operating power from the outside. The power supply voltage Vcc may be a circuit power supply voltage (e.g., 3.3V) provided from the outside. The power supply voltage VccQ may be a power supply voltage (e.g., 1.2V) used when a signal is transmitted/received between the memory controller 1 and the nonvolatile memory 2.

The power supply voltage Vpp may be a power supply voltage (e.g., 12V) higher than the power supply voltage Vcc, for example, to write data and/or erase data. When writing data into the memory cell array 23 and/or erasing data, a high voltage of about 20 V may be utilized. In one aspect, a step-up circuit of the voltage supply circuit 28 can generate a target voltage for writing data and/or erasing data at high speed and with less consumption power by stepping up the power supply voltage Vpp, rather than the power supply voltage Vcc of about 3.3 V. The power supply voltage Vcc may be power supplied to the nonvolatile memory 2, and the power supply voltage Vpp may be power additionally or optionally supplied in accordance with a use environment, for example.

In some embodiments, the logic control circuit 21 and the input/output circuit 22 are connected to the memory controller 1 via a NAND bus. The input/output circuit 22 may transmit/receive the signal DQ (for example, DQ0 to DQ7) to/from the memory controller 1 via the NAND bus.

In some embodiments, the logic control circuit 21 is a circuit or a component that interfaces with the memory controller 1 to transmit/receive various external control signals. The logic control circuit 21 may be implemented as an analog circuit, a digital logic circuit, or a combination of them. For example, the logic control circuit 21 may receive external control signals (for example, the chip enable signal /CE, the command latch enable signal CLE, the address latch enable signal ALE, the write enable signal /WE, the read enable signals RE, /RE, and the write protect signal /WP) from the memory controller 1 via the NAND bus. The logic control circuit 21 may also transmit the ready busy signal /RB to the memory controller 1 via the NAND bus.

In some embodiments, the input/output circuit 22 is a circuit or a component that interfaces with the memory controller 1 to transmit/receive data, addresses, and/or commands. The input/output circuit 22 may be implemented as an analog circuit, a digital logic circuit, or a combination of them. The input/output circuit 22 may transmit/receive the signal DQ<7:0> and the data strobe signals DQS, /DQS to/from the memory controller 1. The input/output circuit 22 may transfer a command and an address in the signal DQ<7:0> to the register 26. The input/output circuit 22 may also transmit/receive data to be written and data to be read to/from the sense amplifier 24.

In some embodiments, the register 26 is a circuit or a component that can store a command, address, status, etc. The register 26 may be embodied as one or more latches, one or more flip flops, SRAM or any component that can temporarily store data. The register 26 may include a command register, an address register, a status register, and the like. The command register may temporarily latch a command. The address register may temporarily latch an address. The status register may temporarily latch data for operating the nonvolatile memory 2.

In some embodiments, the sequencer 27 is a circuit or a component that controls timing of operations of various components of the nonvolatile memory 2. The sequencer 27 may be embodied as an analog circuit, a digital logic circuit, or a combination of them. The sequencer 27 may receive a command from the register 26, and controls various components (e.g., logic control circuit 21, input/output circuit 22, register 26, voltage supply circuit 28, row decoder 25, sense amplifier 24, etc.) of the nonvolatile memory 2 in accordance with a sequence based on the command.

In some embodiments, the voltage supply circuit 28 a circuit or a component that receives a power supply voltage from the outside of the nonvolatile memory 2, and generates a plurality of voltages for a write operation, a read operation, and/or an erase operation, based on the received power supply voltage. The voltage supply circuit 28 may supply the generated voltages to the memory cell array 23, the sense amplifier 24, the row decoder 25, and the like.

In some embodiments, the row decoder 25 is a circuit or a component that applies various voltages to one or more word lines and/or one or more select gate lines of the memory cell array 23, according to a row address from the register 26. In some embodiments, the row decoder 25 may supply a source voltage to source lines SL of the memory cell array 23. For example, the row decoder 25 may receive a row address from the register 26, and decode the row address. The row decoder 25 may select a word line corresponding to the decoded row address. Then, the row decoder 25 may transfer a plurality of voltages for the write operation, the read operation, and the erase operation to the selected word line (or the selected block).

In some embodiments, the sense amplifier 24 is a circuit or a component that applies one or more voltages to bit lines of the memory cell array 23, or senses one or more voltages of bit lines of the memory cell array 23, according to a column address from the register 26. For example, the sense amplifier 24 may receive a column address from the register 26, and decode the column address. The sense amplifier 24 may have a sense amplifier unit group 24A and a data register 24B. The sense amplifier unit group 24A may be connected to each of the bit lines, and may select any bit line based on the decoded column address. The sense amplifier unit group 24A may be a group of sense amplifier circuits or sense amplifier units to read or write data. When reading data, the sense amplifier unit group 24A may sense one or more voltages corresponding to data from memory cell transistors belonging to a page through the bit lines, respectively, and amplify the sensed one or more voltages to read the data. When writing data, the sense amplifier unit group 24A may transfer data to be written to the bit lines.

When reading data, the data register 24B may temporarily latch data detected by the sense amplifier unit group 24A, and transfer the data, for example, in a serial manner to the input/output circuit 22. When writing data, the data register 24B may temporarily latch the data transferred, for example, in a serial manner from the input/output circuit 22, and transfer the data to the sense amplifier unit group 24A. The data register 24B may be embodied as an SRAM and the like.

1-3. Block Configuration of Memory Cell Array

Figure 3:
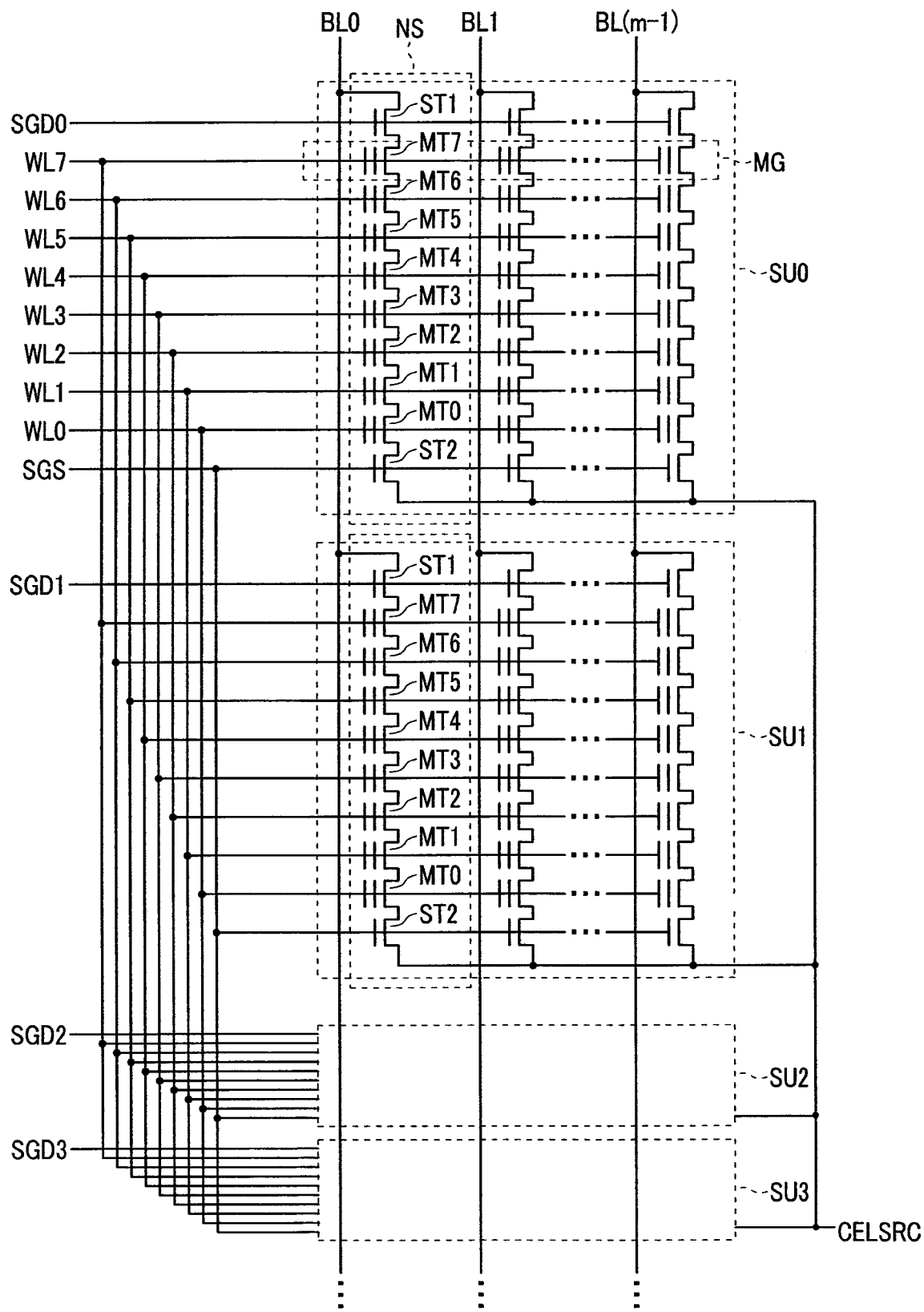
FIG. 3 is a diagram showing a configuration example of an array of memory blocks having a three-dimensional structure, according to some embodiments.

FIG. 3 is a diagram showing a configuration example of blocks of a memory cell array 23 having a three-dimensional structure, according to some embodiments. FIG. 3 shows one block BLK among a plurality of blocks constituting the memory cell array 23. Other blocks of the memory cell array also have a configuration similar to the configuration of FIG. 3. In some embodiments, a memory cell array may have a two-dimensional structure.

As illustrated, the block BLK includes four string units (SU0 to SU3), for example. Each of the string units SU may include a plurality of NAND strings NS. Each of the NAND strings NS herein may include eight memory cell transistors MT (MT0 to MT7) and select gate transistors ST1 and ST2. The memory cell transistors MT may each include a gate and a charge accumulation layer, and latch or store data in a nonvolatile manner. In some embodiments, each NAND string NS may include a fewer or a larger number of memory cell transistors MT than shown in FIG. 3.

The select gate transistors ST1 and ST2 are each shown as one transistor, but may structurally be the same as the memory cell transistors MT. In some embodiments, in order to increase cut-off properties, for example, a plurality of select gate transistors may be used as each of the select gate transistors ST1 and ST2. In some embodiments, dummy cell transistors may further be provided between the memory cell transistors MT and the select gate transistors ST1 and ST2.

In some embodiments, the memory cell transistors MT are arranged so as to be connected in series between the select gate transistors ST1 and ST2. The memory cell transistor MT7 on one end side may be connected to the select gate transistor ST1, and the memory cell transistor MT0 on the other end side may be connected to the select gate transistor ST2.

In one configuration, gates of the select gate transistors ST1 of the respective string units SU0 to SU3 are respectively connected to select gate lines SGD0 to SGD3 (hereinafter referred to as a select gate line SGD when it is not necessary to distinguish the select gate lines SGD0 to SGD3). In one configuration, gates of the select gate transistors ST2 are connected in common to an identical select gate line SGS among the plurality of the string units SU located in an identical block BLK. Gates of the memory cell transistors MT0 to MT7 located in the identical block BLK are connected in common to word lines WL0 to WL7, respectively. In one aspect, the word lines WL0 to WL7 and the select gate line SGS are connected in common to the plurality of string units SU0 to SU3 in the identical block BLK, and the select gate line SGD is independent for each of the string units SU0 to SU3 even in the identical block BLK.

In one configuration, the word lines WL0 to WL7 are respectively connected to the gates of the memory cell transistors MT0 to MT7 constituting the NAND string NS. The gates of memory cell transistors MTi located in an identical row in the block BLK may be connected to an identical word line WLi. Note that in the following description, the NAND string NS may simply be called a "string".

In one configuration, each of the NAND strings NS is connected to a corresponding bit line. Consequently, each of the memory cell transistors MT may be connected to the bit line via the select gate transistors ST and the other memory cell transistors MT included in the NAND string NS. As described above, data in the memory cell transistors MT located in the identical block BLK may be collectively erased. On the other hand, reading and writing of data may be performed on a memory cell group MG basis (or on a page basis). In the present specification, a plurality of memory cell transistors MT connected to one word line WLi and belonging to one string unit SU are defined as the memory cell group MG. During the read operation and the write operation, one word line WLi and one select gate line SGD may be selected in accordance with a physical address to select a particular memory cell group MG.

1-4. Cross-Sectional Structure of Nonvolatile Memory

Figure 4:
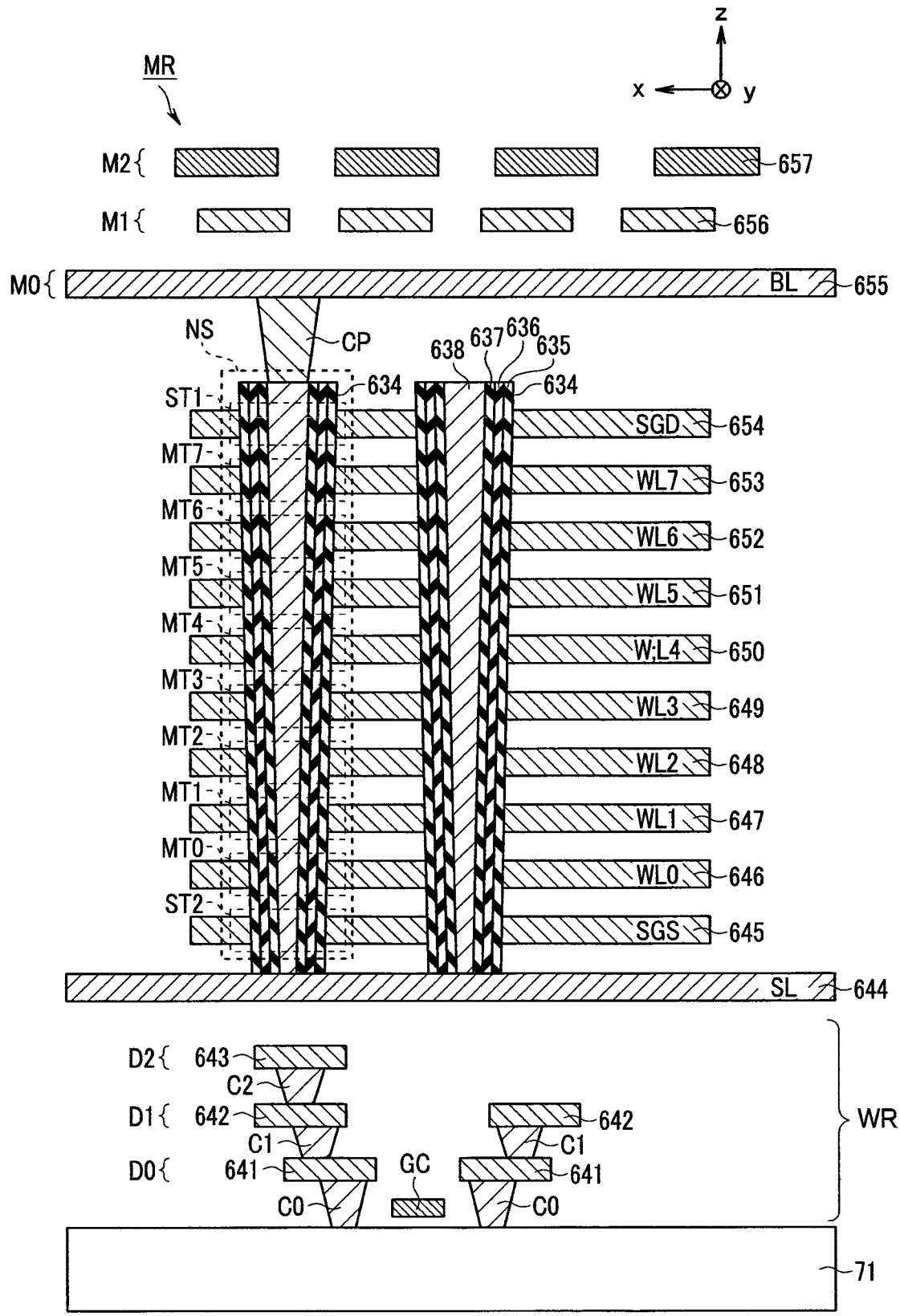
FIG. 4 is an example of a cross-sectional view of some regions of a semiconductor storage device, according to some embodiments.

FIG. 4 is an example of a cross-sectional view of some regions of the semiconductor storage device according to some embodiments. FIG. 4 shows an example in which a peripheral circuit region corresponding to peripheral circuits such as the sense amplifier 24 and the row decoder 25 is provided on a semiconductor substrate 71, and a memory region is provided in a layer above the peripheral circuit region. Note that in the following description, two perpendicular directions horizontal to a surface of the semiconductor substrate 71 are referred to as an x-direction and a y-direction, and a direction vertical to the surface of the semiconductor substrate 71 is referred to as a z-direction.

As shown in FIG. 4, in a memory region MR, the nonvolatile memory includes the semiconductor substrate 71, conductors 641 to 657, memory pillars 634, and contact plugs C0, C1, C2, and CP. Note that in FIG. 4, a p-type well region or n-type well region formed in an upper surface portion of the semiconductor substrate 71, an impurity diffused region formed in each of the well regions, a gate insulation film and an element isolation region that insulate the well regions are not shown for simplicity.

In the memory region MR, a conductor GC may be provided on the semiconductor substrate 71 with the interposition of the gate insulation film (not shown). A plurality of contact plugs C0, for example, are respectively provided in a plurality of impurity diffused regions (not shown) provided on the semiconductor substrate 71, such that the conductor GC can be disposed between two contact plugs C0. The memory cell array 23 may be arranged on the semiconductor substrate 71 with the interposition of a wiring layer region WR.

A conductor 641 that forms a wiring pattern may be provided on a corresponding one of contact plugs C0. In one example, the conductor GC functions as a gate electrode of a transistor, and the conductor 641 functions as a source electrode or a drain electrode of the transistor.

A contact plug C1, for example, is provided on a corresponding one of the conductors 641. A conductor 642, for example, is provided on a corresponding one of the contact plugs C1. A contact plug C2, for example, is provided on a corresponding one of the conductors 642. A conductor 643, for example, is provided on a corresponding one of the contact plugs C2.

Respective wiring patterns of the conductors 641, 642, and 643 may be disposed in the wiring layer region WR between the sense amplifier circuit and the memory cell array (not shown). Hereinafter, wiring layers in which the conductors 641, 642, and 643 are provided are called wiring layers D0, D1, and D2, respectively. The wiring layers D0, D1, and D2 may be provided in a lower layer portion of the nonvolatile memory 2. Note that although the three wiring layers are provided herein in the wiring layer region WR, two or less wiring layers or four or more wiring layers may be provided in the wiring layer region WR.

The conductor 644 may be provided above the conductor 643 with the interposition of an interlayer insulation film, for example. The conductor 644 may be formed in a plate shape parallel to the xy plane, for example, and functions as the source line SL. The conductors 645 to 654, for example, may be sequentially stacked above the conductor 644 in correspondence to the respective NAND strings NS. An interlayer insulation film (not shown) may be provided between conductors adjacent to each other in the z-direction among these conductors.

Each of the conductors 645 to 654 may be formed in a plate shape parallel to the xy plane, for example. For example, the conductor 645 functions as the select gate line SGS, the conductors 646 to 653 function as the word lines WL0 to WL7, respectively, and the conductor 654 functions as the select gate line SGD.

In one configuration, each of the memory pillars 634 has a pillared shape, and extends through each of the conductors 645 to 654 to come into contact with the conductor 644. The memory pillar 634 includes a semiconductor pillar 638 on the central side, a tunnel insulation film 637 formed on the outside of the semiconductor pillar 638, a charge accumulation film 636 formed on the outside of the tunnel insulation film 637, and a block insulation film 635 formed on the outside of the charge accumulation film 636, for example.

For example, a portion in which the memory pillar 634 and the conductor 645 cross each other functions as the select gate transistor ST2. For example, a portion in which the memory pillar 634 and each of the conductors 646 to 653 cross each other functions as the memory cell transistor (memory cell) MT. For example, a portion in which the memory pillar 634 and the conductor 654 cross each other functions as the select gate transistor ST1.

In one configuration, the conductor 655 is provided in a layer above the upper surface of the memory pillar 634 with the interposition of an interlayer insulation film. The conductor 655 may be formed in a linear shape extending in the x-direction, and may correspond to the bit line BL. A plurality of the conductors 655 may be arrayed (not shown) at intervals in the y-direction. The conductor 655 may be electrically connected to the semiconductor pillar 638 in a corresponding one of the memory pillars 634 in each of the string units SU.

More specifically, in each of the string units SU, the contact plug CP may be provided on a corresponding semiconductor pillar 638 of a memory pillars 634, for example, and a corresponding conductor 655 may be provided on the contact plug CP. Note that the present embodiment is not limited to such a configuration, and the semiconductor pillar 638 in the memory pillar 634 and the conductor 655 may be connected with the interposition of a plurality of contact plugs, wirings, and the like.

The conductor 656 may be provided in a layer above the layer in which the conductor 655 is provided with the interposition of an interlayer insulation film. The conductor 657 may be provided in a layer above the layer in which the conductor 656 is provided with the interposition of an interlayer insulation film.

The conductors 656 and 657 may correspond to wirings configured to connect wirings provided in the memory cell array and the peripheral circuits provided below the memory cell array, for example. The conductors 656 and 657 may be connected by pillared contact plugs (not shown). Herein, a layer in which the conductor 655 is provided is called a wiring layer M0, a layer in which the conductor 656 is provided is called a wiring layer M1, and a layer in which the conductor 657 is provided is called a wiring layer M2.

As shown in FIG. 4, the semiconductor storage device of the embodiment has the wiring layers D0, D1, and D2 formed in layers below the string units SU. The wiring layers M0, M1, and M2 are formed in a layer above the string units SU. The conductors 641, 642, 643 in the wiring layers D0, D1, and D2 may be tungsten wirings formed by the damascene method, for example.

The conductors 657 in the wiring layer M2 may be aluminum wirings formed by anisotropic etching such as reactive ion etching (RIE). Since the conductors 657 in the wiring layer M2 may have a large film thickness and a low resistance, power supply (Vcc, Vss) can be provided through the conductors 657 in the wiring layer M2. The conductors 656 in the wiring layer M1 may be copper (Cu) wirings formed by the damascene method, for example. Since the Cu wiring may have high wiring reliability such as EM (electromigration) resistance, the conductors 656 in the wiring layer M1 may reliably convey data or signals. The conductor 655 in the wiring layer M0 may be a Cu wiring formed by the damascene method, for example. The conductor 655 in the wiring layer M0 may be used as the bit line BL, and provide some of the power supply. Note that wirings such as signal lines other than for providing power supply preferably have a low resistance, and are therefore can be formed using conductors in the upper layer (for example, the wiring layer M2).

1-5. Configuration of Voltage Supply Circuit and Row Decoder

Figure 5:
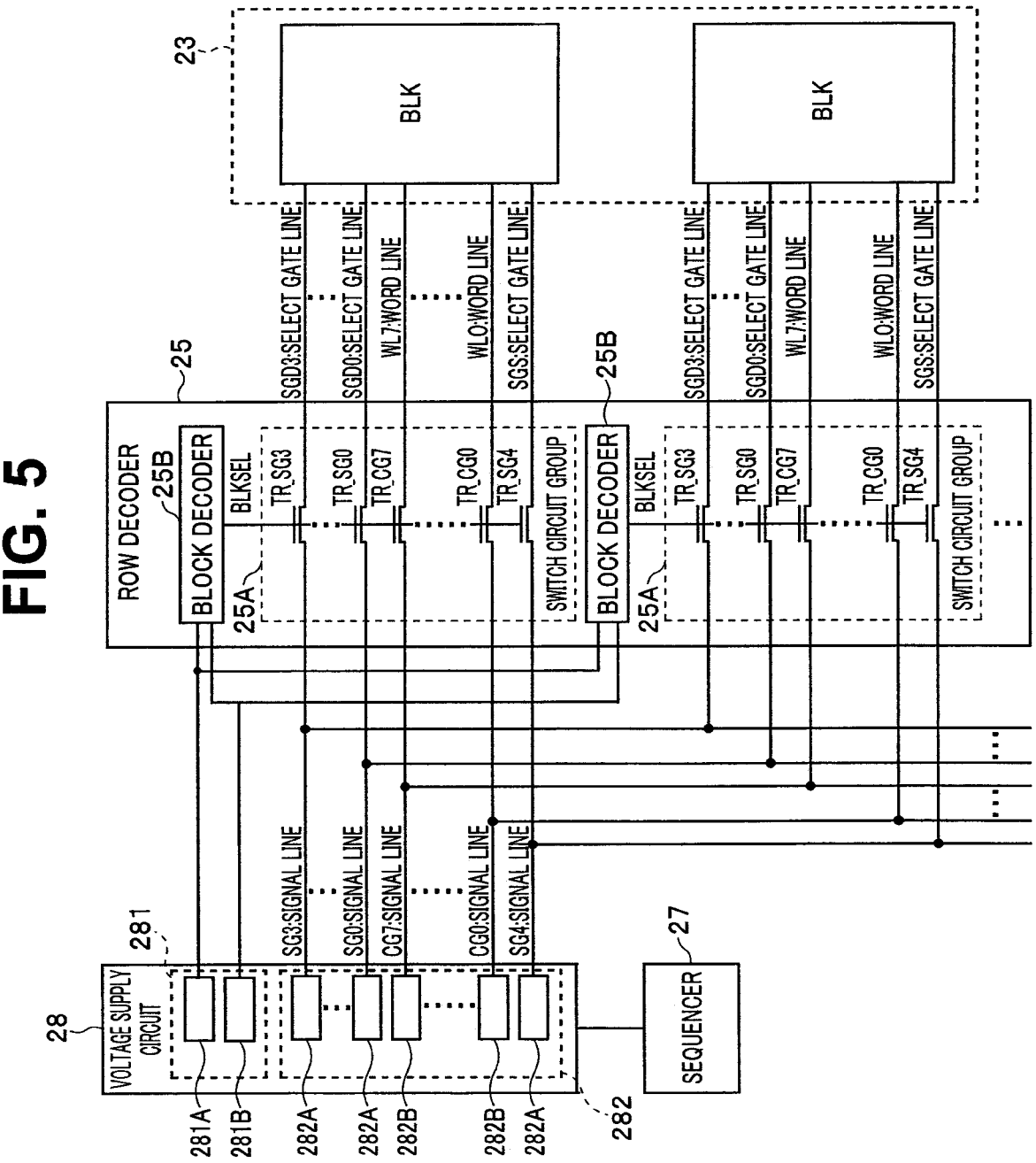
FIG. 5 is a block diagram showing an example of a configuration of a voltage supply circuit and a row decoder, according to some embodiments.

FIG. 5 is a block diagram showing an example of a configuration of the voltage supply circuit 28 and the row decoder 25. Note that in FIG. 5, only some components of the voltage supply circuit 28 are shown for simplicity.

In FIG. 5, the voltage supply circuit 28 is controlled by the sequencer 27 to generate various voltages for the write operation, the read operation, the erase operation, and the like for the memory cell transistors MT. The voltage supply circuit 28 may have a voltage generation circuit 281 and a voltage adjustment circuit 282. The voltage generation circuit 281 may be a circuit or a component that generate internal voltages for operating the nonvolatile memory 2. The voltage generation circuit 281 may have a BDH power supply voltage generation circuit 281A and a BDL power supply voltage generation circuit 281B. The BDH power supply voltage generation circuit 281A may generate a power supply voltage (VRD) in a high level to be used in the block decoder 25B of the row decoder 25. The BDL power supply voltage generation circuit 281B may generate a power supply voltage (VBB) in a low level lower than the power supply voltage VRD to be used in the block decoder 25B. The power supply voltage VBB may be a negative voltage.

The voltage adjustment circuit 282 may be a circuit or a component that generate various voltages for operating each part of the nonvolatile memory 2, according to voltages inputted from the power source inputting terminal group 35 and voltages generated in the voltage generation circuit 281. Then, the voltage adjustment circuit 282 may select appropriate voltages from the generated voltages and supply the voltages to signal lines SG0 to SG4 and signal lines CG0 to CG7. The voltage adjustment circuit 282 may include an SG driver 282A that supplies voltages to the signal lines SG0 to SG4, and a plurality of CG drivers 282B that supply voltages to the signal lines CG0 to CG7, respectively. The signal lines SG0 to SG4 and CG0 to CG7 may be branched by the row decoder 25 and connected to wirings of the respective blocks BLK. For example, the signal lines SG0 to SG3 may function as global drain side select gate lines, and may be connected to the select gate lines SGD0 to SGD3 as local select gate lines in the respective blocks BLK via the row decoder 25. The signal lines CG0 to CG7 may function as global word lines, and may be connected to the word lines WL0 to WL7 as local word lines in the respective blocks BLK via the row decoder 25. The signal line SG4 may function as a global source side select gate line, and may be connected to the select gate line SGS as a local select gate line in each of the blocks BLK via the row decoder 25.

In some embodiments, the row decoder 25 may be a circuit or a component that selectively connects signal lines (e.g., SG0-SG4 and CG0-CG7) to corresponding block. The row decoder 25 may include a plurality of switch circuit groups 25A respectively corresponding to the respective blocks and a plurality of block decoders 25B respectively provided in correspondence to the plurality of the switch circuit groups 25A. Each of the switch circuit groups 25A may include a plurality of transistors TR_SG0 to TR_SG4 configured to connect the signal lines SG0 to SG4 and the select gate lines SGD0 to SGD3 and SGS, respectively, and a plurality of transistors TR_CG0 to TR_CG7 configured to connect the signal lines CG0 to CG7 and the word lines WL0 to WL7, respectively. Each of the transistors TR_SG0 to TR_SG4 and the transistors TR_CG0 to TR_CG7 may be embodied as a high withstand voltage transistor.

When each of the block decoders 25B is designated by a row address, each of the block decoders 25B may supply a block select signal BLKSEL in a high level to gates of the transistors TR_SG0 to TR_SG4 and the transistors TR_CG0 to TR_CG7. Accordingly, in the switch circuit group 25A supplied with the block select signal BLKSEL in the high level from the block decoder 25B designated by the row address, the transistors TR_SG0 to TR_SG4 and the transistors TR_CG0 to TR_CG7 may be turned on to become conducting. Thus, the voltages supplied from the voltage supply circuit 28 to the signal lines SG0 to SG4 and the signal lines CG0 to CG7 may be supplied to the select gate lines SGD0 to SGD3, SGS and the word lines WL0 to WL7 included in the block BLK to be an operation target.

On the other hand, when each of the block decoders 25B is not designated by a row address, each of the block decoders 25B may supply the block select signal BLKSEL in a low level to the gates of the transistors TR_SG0 to TR_SG4 and the transistors TR_CG0 to TR_CG7. Accordingly, in the switch circuit group 25A supplied with the block select signal BLKSEL in the low level from the block decoder 25B designated by the row address, the transistors TR_SG0 to TR_SG4 and the transistors TR_CG0 to TR_CG7 may be turned off to become non-conducting. Thus, the voltages supplied from the voltage supply circuit 28 to the signal lines SG0 to SG4 and the signal lines CG0 to CG7 may not be supplied to the select gate lines SGD0 to SGD3, SGS and the word lines WL0 to WL7 included in the block BLK which is not an operation target.

In one approach, during the read operation, a voltage VREAD and a voltage Vr are supplied to a selected word line WL_sel of a selected block and the voltage VREAD or VREADK is supplied to an unselected word line WL_usel by the voltage supply circuit 28 and the row decoder 25. The voltage Vr may be a read voltage. The voltage VREAD may be a sufficiently high voltage for turning on the memory cell transistor connected to the unselected word line WL_usel. The voltage VREADK may be a voltage to be supplied to an adjacent word line adjacent to the selected word line WL_sel among the unselected word lines WL_usel. The voltage VREADK may be slightly higher than the voltage VREAD in order to facilitate conduction of the memory cell transistor connected to the adjacent word line. A voltage VSG may be supplied to the select gate line SGD_sel connected to the select gate transistor ST1 belonging to the string unit SU to be an operation target, for example, and the voltage Vss of 0 V or the like may be supplied to the select gate line SGD_usel connected to the select gate transistor ST1 not belonging to the string unit SU to be an operation target. The word lines WL of unselected blocks may be floated, and the voltage Vss of 0 V or the like may be supplied to the select gate lines SGD and SGS.

Figure 6:
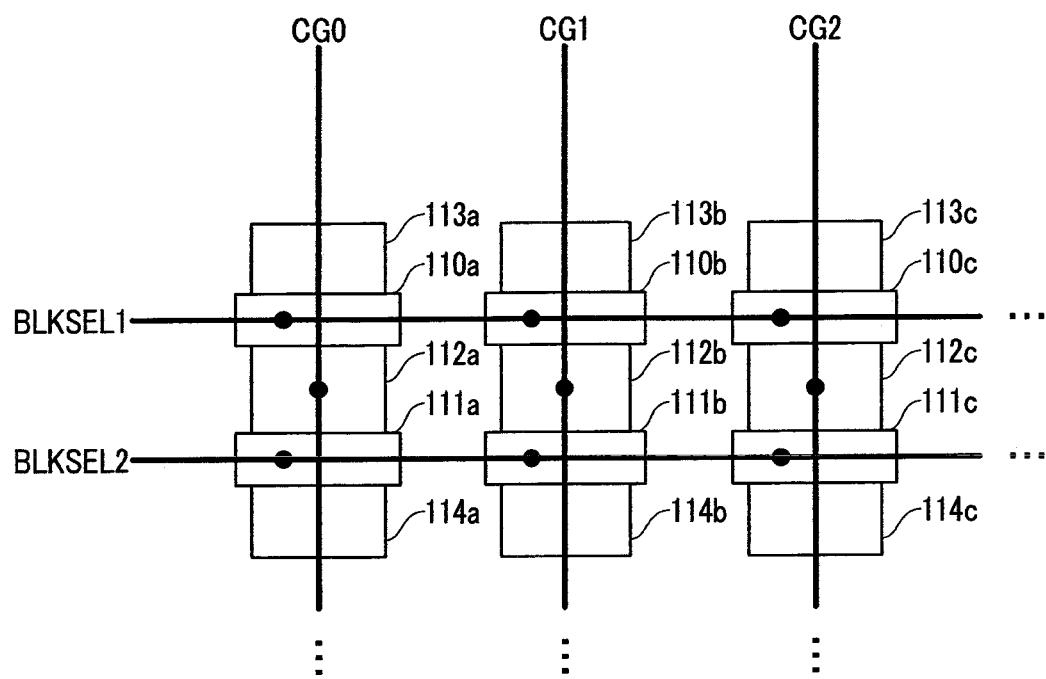
FIG. 6 is a layout diagram showing an example of a layout of a switch circuit group, according to some embodiments.

FIG. 6 is a layout diagram showing an example of a layout of the switch circuit group 25A, according to some embodiments. Note that FIG. 6 shows only some components of the switch circuit group 25A for simplicity.

In one configuration, gates 110*a*, 110*b*, and 110*c* of the transistors TR_CG0, TR_CG1, and TR_CG2 connected to a certain block BLK may be connected to a block select signal BLKSEL1.

In one configuration, gates 111*a*, 111*b*, and 111*c* of the transistors TR_CG0, TR_CG1, and TR_CG2 connected to another block BLK may be connected to a block select signal BLKSEL2.

In one configuration, a source 112*a* can be implemented as a common source or a shared source of two adjacent transistors TR_CG0 in different blocks, and can be connected to the signal line CG0.

A drain 113*a* of the transistor TR_CG0 connected to the certain block BLK and a drain 114*a* of the transistor TR_CG0 connected to the other block BLK may be formed separately.

As will be described later in detail, a negative voltage of −0.5 V, for example, may be applied via the block select signal BLKSEL to the gate 110*a* of the transistor TR_CG configured to function as a word line switch of the unselected block BLK. The voltage Vss of 0 V, for example, is applied via the signal line CG to the source 112*a* of two adjacent transistors TR_CG. An erase voltage Vera11 of 19.5 V, for example, is applied to the drains 113*a* and 114*a* of the transistors TR_CG by a capacitive coupling with the source line SL.

Figure 7:
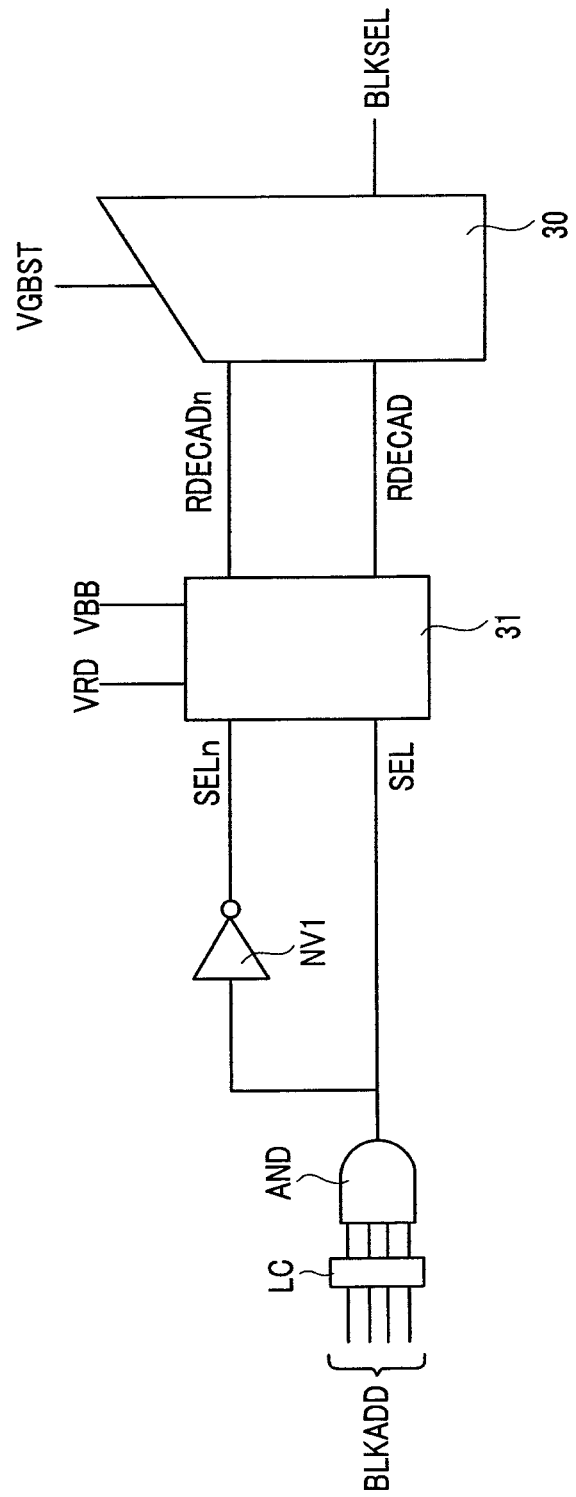
FIG. 7 is a block diagram showing an example of a configuration of a block decoder, according to some embodiments.

FIG. 7 is a block diagram showing an example of a configuration of the block decoder, according to some embodiments. The block decoder 25B may have a logic circuit LC, an AND circuit AND, an inverter NV1, a level conversion circuit 30, and a negative voltage generation circuit 31, for example.

In some embodiments, the logic circuit LC is a circuit or a component that generates an output signal based on a block address signal BLKADD inputted from the register 26. Output signals of the logic circuit LC may have the "H" level (high level) in the block decoder 25B corresponding to the block address signal BLKADD, and any of the output signals may have the "L" level (low level) in the block decoder 25B not corresponding to the block address signal BLKADD. The AND circuit AND may be a circuit or a component that performs an AND operation on outputs signals of the logic circuit LC. The AND circuit may output an AND result of output signals of the logic circuit LC as a signal SEL to the inverter NV1 and the negative voltage generation circuit 31. For example, the signal SEL in the "H" level may be outputted in the block decoder 25B corresponding to the block address signal BLKADD and determined that a corresponding one of the blocks BLK is normal. The signal SEL in the "L" level may be outputted in the block decoder 25B not corresponding to the block address signal BLKADD or determined that a corresponding one of the blocks BLK is abnormal (e.g., unintended misconnection, disconnection, short circuit connection, etc.). The inverter NV1 may be a circuit or a component that inverts the signal SEL outputted from the AND circuit AND. The inverter NV1 may output a signal SELn as a result of inversion.

Figure 8:
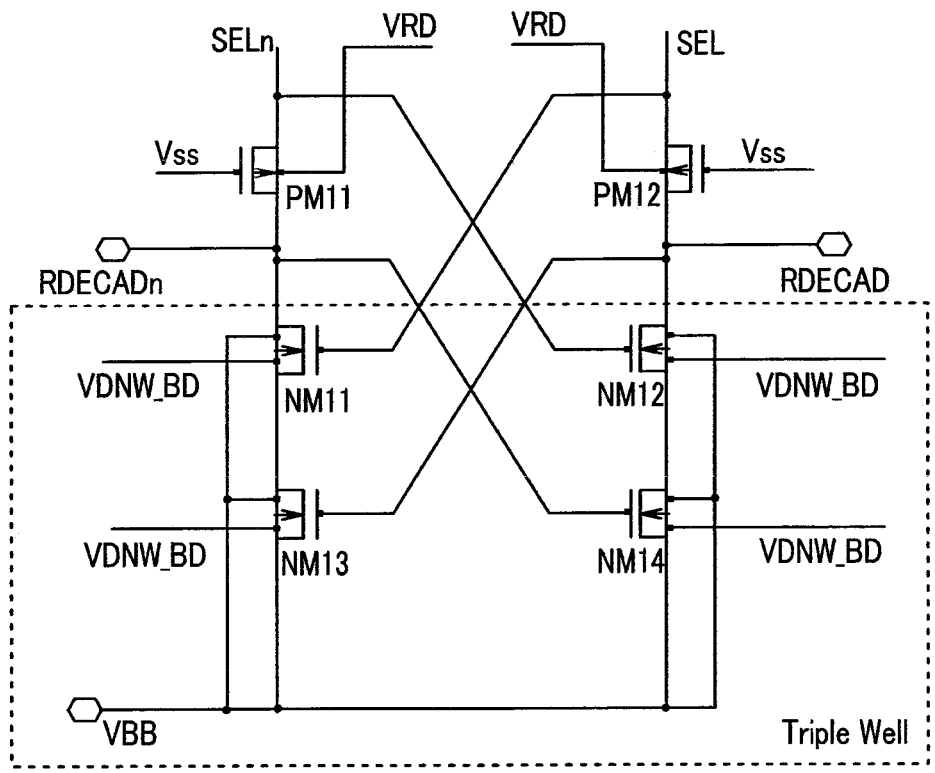
FIG. 8 is a circuit diagram showing an example of a configuration of a negative voltage generation circuit, according to some embodiments.

The negative voltage generation circuit 31 may be a circuit or a component that can generate the power supply voltage VBB (e.g., a negative voltage), based on the ground voltage Vss inputted as the signal SEL or the signal SELn. FIG. 8 is a circuit diagram showing an example of a configuration of the negative voltage generation circuit 31, according to some embodiments. The negative voltage generation circuit 31 may include two PMOS transistors PM11 and PM12 and four NMOS transistors NM11, NM12, NM13, and NM14. In one configuration, the PMOS transistor PM11 and the NMOS transistors NM11 and NM13 are connected in series between an input terminal of the signal SELn and an input terminal of the power supply voltage VBB. In one configuration, the PMOS transistor PM12 and the NMOS transistors NM12 and NM14 are connected in series between an input terminal of the signal SEL and the input terminal of the power supply voltage VBB.

The ground voltage Vss may be applied to gates of the PMOS transistors PM11 and PM12. The signal SEL may be applied to a gate of the NMOS transistor NM11. The signal SELn may be applied to a gate of the NMOS transistor NM12. A voltage at a connection point between the PMOS transistor PM12 and the NMOS transistor NM12 may be applied to a gate of the NMOS transistor NM13. A voltage at a connection point between the PMOS transistor PM11 and the NMOS transistor NM11 may be applied to a gate of the NMOS transistor NM14. The power supply voltage VRD may be supplied to the PMOS transistors PM11 and PM12 as a well voltage. The NMOS transistors NM11 to NM14 may have a triple well structure.

Figure 9:
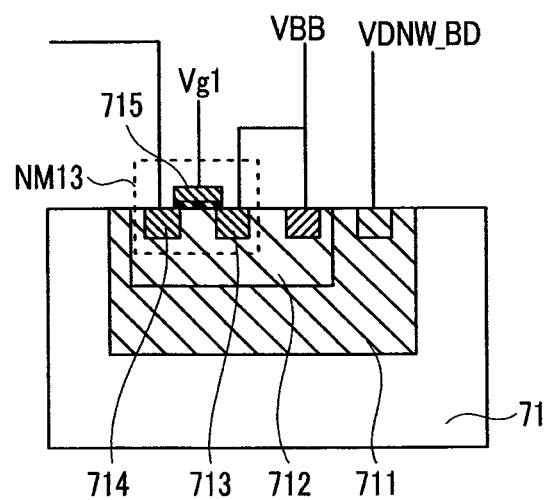
FIG. 9 is a cross-sectional view illustrating a structure of an NMOS transistor in the negative voltage generation circuit, according to some embodiments.

FIG. 9 is a cross-sectional view illustrating a structure of an NMOS transistor NM13 in the negative voltage generation circuit 31, according to some embodiments. Although FIG. 9 shows the structure of the NMOS transistor NM13, other NMOS transistors NM11, NM12, and NM14 may also have a similar structure. The NMOS transistor NM13 may have an N well 711 formed in a predetermined region of the p-type semiconductor substrate 71 by implanting and diffusing an n-type impurity (for example, arsenic (As)). A P well 712 obtained by implanting and diffusing a p-type impurity (for example, boron (B)) may be formed in the N well 711. A source region 713 and a drain region 714 obtained by implanting and diffusing an n-type impurity (for example, phosphorus (P)) may be formed in the P well 712. A gate electrode 715 including a conductive material may be provided on the semiconductor substrate between the source region 713 and the drain region 714 with the interposition of a gate insulation film. For example, the NMOS transistor NM13 may include the source region 713, the drain region 714, and the gate electrode 715. The power supply voltage VBB which is negative may be supplied to the source region 713 and the P well 712. A voltage VDNW_BD (≥0 V) may be supplied to the N well 711. In a case of an NMOS transistor having a structure in which the N well 711 is not provided, a forward bias may be applied between the n-type source region 713 and the p-type semiconductor substrate 71 fixed at the ground voltage Vss (0 V) when a negative voltage is applied to the n-type source region 713, resulting in a flow of a large leakage current from the NMOS transistor NM13 to the semiconductor substrate 71. In some embodiments, by configuring the NMOS transistor NM13 to have such a triple well structure, a leakage path can be blocked by the N well 711 formed between the P well 712 and the semiconductor substrate 71 even if a negative voltage is applied to the source region 713.

The voltage at the connection point between the PMOS transistor PM12 and the NMOS transistor NM12 may be outputted as a signal RDECAD. The voltage at the connection point between the PMOS transistor PM11 and the NMOS transistor NM11 may be outputted as a signal RDECADn.

When the signal SEL has the "H" level, the signal SELn may have the "L" level. When the signal SEL has the "H" level, the power supply voltage VRD can be applied to a body of the PMOS transistor PM12. When the signal SELn has the "L" level, the ground voltage Vss can be inputted to one end of the PMOS transistor PM11. In this case, the PMOS transistor PM12 can be turned on, and the PMOS transistor PM11 can be turned off. Since the signal SEL of the "H" level is applied to the gates of the NMOS transistors NM11 and NM13, the NMOS transistors NM11 and NM13 can be turned on. Since the signal SELn of the "L" level is applied to the gate of the NMOS transistor NM12, the NMOS transistor NM12 can be turned off. Since the voltage VBB is applied to the gate of the NMOS transistor NM14, the NMOS transistor NM14 can be turned off. On/off of each of the transistors PM11, PM12, and NM11 to NM14 can be switched in this manner, so that the voltage VRD can be outputted as the signal RDECAD and the voltage VBB can be outputted as the signal RDECADn.

When the signal SEL has the "L" level, the signal SELn may have the "H" level. When the signal SEL has the "L" level, the power supply voltage Vss can be applied to one end of the PMOS transistor PM12. When the signal SELn has the "H" level, the power supply voltage VRD can be applied to a body of the PMOS transistor PM11. In this case, the PMOS transistor PM11 can be turned on, and the PMOS transistor PM12 can be turned off. Since the signal SELn of the "H" level is applied to the gates of the NMOS transistors NM12 and NM14, the NMOS transistors NM12 and NM14 can be turned on. Since the signal SEL of the "L" level is applied to the gate of the NMOS transistor NM11, the NMOS transistor NM11 can be turned off. Since the voltage VBB is applied to the gate of the NMOS transistor NM13, the NMOS transistor NM13 can be turned off. On/off of each of the transistors PM11, PM12, and NM11 to NM14 can be switched in this manner, so that the voltage VBB can be outputted as the signal RDECAD and the voltage VRD can be outputted as the signal RDECADn. The signal RDECAD and the signal RDECADn outputted from the negative voltage generation circuit 31 can be provided to the level conversion circuit 30.

In some embodiments, the level conversion circuit 30 is a circuit or a component that converts the signal RDECAD in accordance with the power supply voltage VRD into the signal BLKSEL in accordance with a high power supply voltage (VGBST). For example, when the signal RDECAD in the "H" level and the signal RDECADn in the "L" level in accordance with the power supply voltage VRD are received, the level conversion circuit 30 can convert the received signals into the signal BLKSEL in the "H" level in accordance with the power supply voltage VGBST and outputs the signal BLKSEL. When the signal RDECAD in the "L" level and the signal RDECADn in the "H" level are received, the level conversion circuit 30 can output the signal RDECAD in the "L" level as the signal BLKSEL in the "L" level. In one aspect, the power supply voltage VGBST may be set at a voltage that turns on the transistors TR_SG0 to TR_SG4 and the transistors TR_CG0 to TR_CG7 of the switch circuit group 25A corresponding to the selected block.

Figure 10:
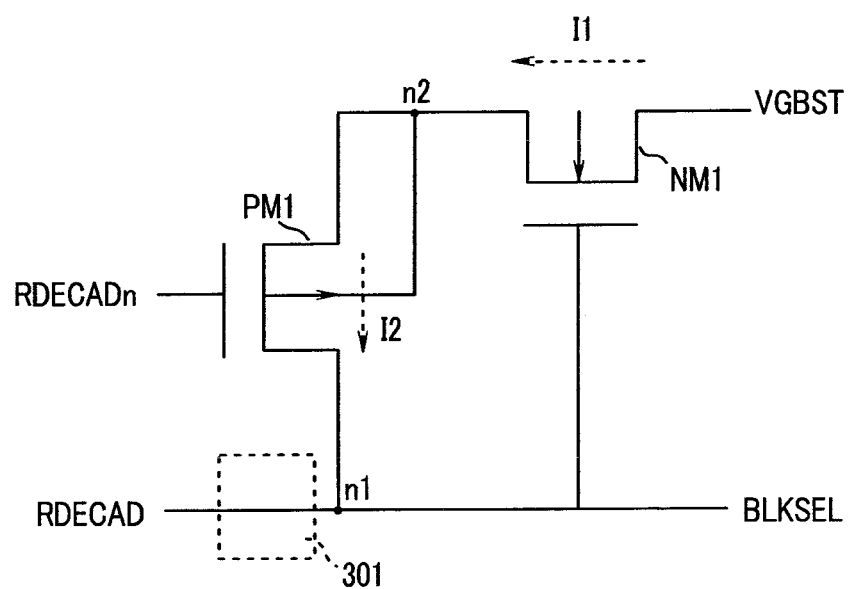
FIG. 10 is a block diagram showing an example of a configuration of a level conversion circuit, according to some embodiments.

FIG. 10 is a block diagram showing an example of a configuration of the level conversion circuit 30, according to some embodiments. In some embodiments, the level conversion circuit 30 includes a depression-type NMOS transistor NM1 and a high withstand voltage PMOS transistor PM1. The power supply voltage VGBST can be inputted to one end of the NMOS transistor NM1. The other end of the NMOS transistor NM1 may be connected to one end of the PMOS transistor PM1. The signal RDECAD can be inputted to the other end of the PMOS transistor PM1. The signal RDECAD can be also inputted to a gate of the NMOS transistor NM1. The signal RDECADn can be inputted to a gate of the PMOS transistor PM1. The signal BLKSEL can be outputted from the other end of the PMOS transistor PM1. In some embodiments, a backflow preventing circuit 301 can be provided between an input terminal of the signal RDECAD and a connection point n1 of the other end of the PMOS transistor PM1.

When the signal RDECAD has the "H" level (e.g., the voltage VRD), and the signal RDECADn has the "L" level (e.g., the voltage VBB) in the level conversion circuit 30, the NMOS transistor NM1 and the PMOS transistor PM1 may be both turned on. Consequently, the power supply voltage VGBST inputted to the one end of the NMOS transistor NM1 can be outputted as the signal BLKSEL. Note that although the power supply voltage VGBST is larger than the voltage VRD, the backflow preventing circuit 301 can prevent outflow to the input terminal side of the signal RDECAD. Thus, the output level of the signal BLKSEL may be kept at the power supply voltage VGBST.

When the signal RDECAD has the "L" level (e.g., the voltage VBB), and the signal RDECADn has the "H" level (e.g., the voltage VRD) in the level conversion circuit 30, the NMOS transistor NM1 may not be completely turned off because the NMOS transistor NM1 is the depression type. Thus, a current I1 may flow in the NMOS transistor NM1, so that the voltage at a connection point n2 between the NMOS transistor NM1 and the PMOS transistor PM1 can be stepped up to about 2 V, for example. On the other hand, the voltage VRD can be applied to the gate of the PMOS transistor PM1. The voltage VRD is 2.5 V, for example, and thus the voltage applied to the gate is larger than the voltage at the connection point n2. Thus, the PMOS transistor PM1 can be turned off. Consequently, the voltage VBB can be outputted as the signal BLKSEL.

2. Erase Operation

In some embodiments, the sequencer 27 can perform the erase operation. In some embodiments, the memory controller 1 or other components may perform the erase operation. In the following description, the block BLK (a first block) to be a target of the erase operation is called a selected block BLK_sel, and the block BLK (a second block) not to be a target of the erase operation is called an unselected block BLK_usel.

2-1. Erase Operation According to Comparative Example

Figure 11:
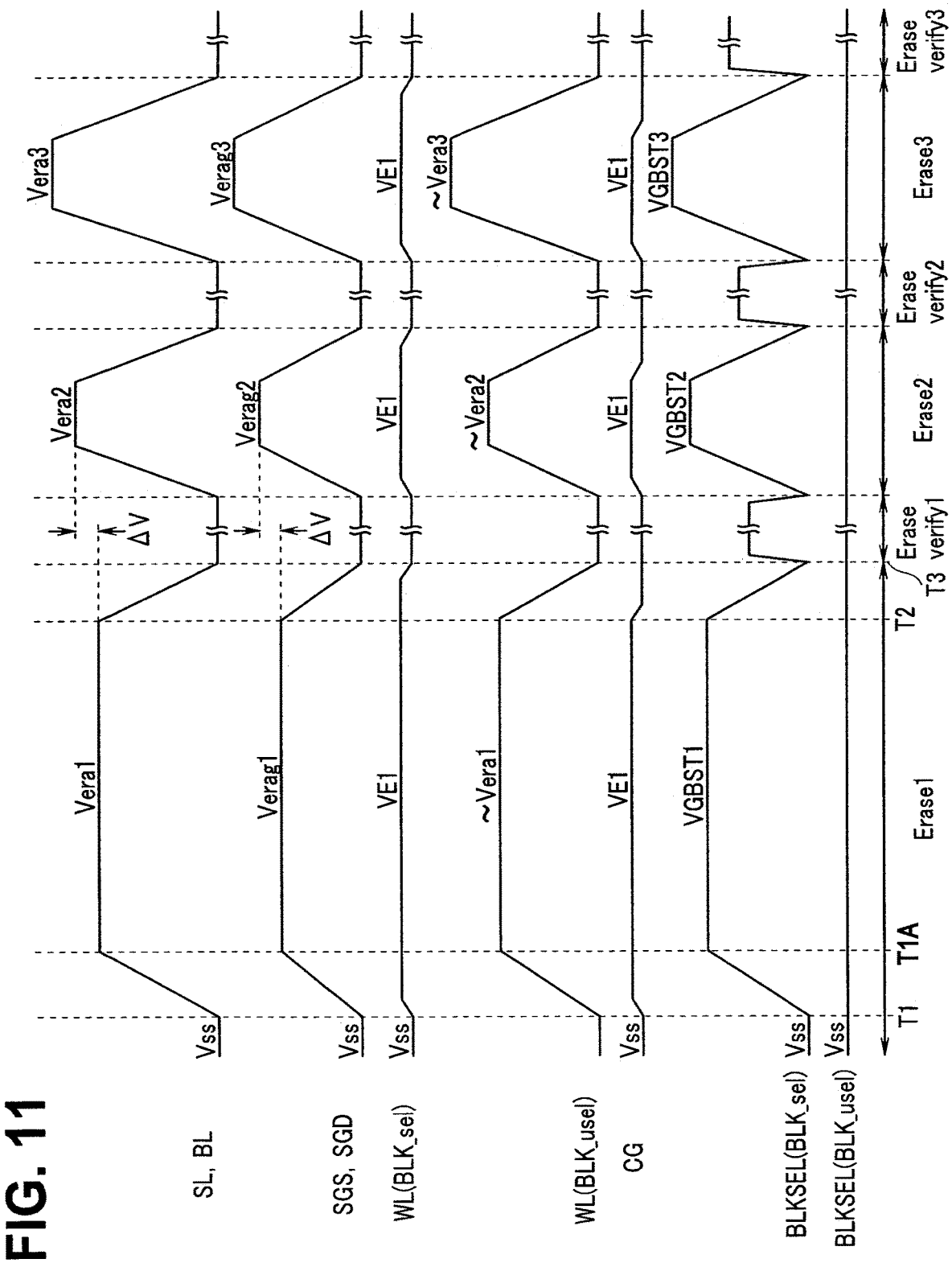
FIG. 11 is a waveform diagram showing an example of voltages for an erase operation according to one example.

First, an erase operation according to a comparative example is described with reference to FIG. 11. FIG. 11 is a waveform diagram showing an example of voltages of respective wirings during the erase operation according to the comparative example.

An erase operation to erase data may include an erase voltage apply operation (Erase) and an erase verify operation (Erase verify). An erase voltage apply operation may be an operation to apply various voltages to memory cells to cause data stored by the memory cells to be erased. An erase verify operation may be an operation to confirm or verify whether data stored by the memory cells are successfully erased. In one example, the erase voltage apply operation (Erase) can be performed for the plurality of NAND strings NS (e.g., all the string units SU in the block BLK) together, and the erase verify operation (Erase verify) can be performed for each of the string units SU separately. In the erase operation, a first erase voltage apply operation Erase1 may be performed first.

(Erase1, First Erase Voltage Apply Operation)

The sequencer 27 may execute a first erase voltage apply operation (Erase1). At or before the start of the erase operation at a time point T1, the sequencer 27 may set the source line SL, the select gate line SGS, the word line WL in the selected block BLK_sel, the signal line CG, the block select signal BLKSEL in the selected block BLK_sel, and the block select signal BLKSEL in the unselected block BLK_usel at the voltage Vss, which may be the ground voltage. The sequencer 27 may also cause the word line WL in the unselected block BLK_usel to be electrically floated.

To perform Erase1 operation, the sequencer 27 may step up or increase the voltage of the source line SL from the voltage Vss at the time point T1. The voltage of the source line SL may be increased to an erase voltage Vera1 at a time point T1A. Between a time period between the time point T1A and a time point T2, the sequencer 27 may cause the voltage of the source line SL to be maintained at the erase voltage Vera1 to perform the first erase voltage apply operation Erase1. The erase voltage Vera1 is 20 V, for example, but is not limited to this value, and may be another voltage. When the first erase voltage apply operation Erase1 is performed, the voltage of the bit lines BL may follow the voltage of the source line SL. For example, the voltage of the bit lines BL may be increased from the voltage Vss at the time point T1 to the erase voltage Vera1 at the time point T1A. Between the time period between the time point T1A and the time point T2, the sequencer 27 may cause the voltage of the bit line BL to be maintained at the erase voltage Vera1 to perform the first erase voltage apply operation Erase1. The same erase voltage Vera1 may be applied to the source line SL and the bit lines BL, for example, to simplify the configuration of the voltage supply circuit 28. Alternatively, different erase voltages may be applied to the source line SL and the bit lines BL, respectively, for example, depending on the characteristics (e.g., channel lengths or widths) of the select gate transistors ST1 and ST2.

At the time point T1, the sequencer 27 may step up or increase the voltage of the select gate line SGS in the selected block BLK_sel from the voltage Vss to perform Erase1 operation. The voltage of the select gate line SGS may be increased to an erase voltage Verag1 at the time point T1A. Between the time period between the time point T1A and the time point T2, the sequencer 27 may cause the voltage of the select gate line SGS to be maintained at the erase voltage Verag1 to perform the first erase voltage apply operation Erase1. The erase voltage Verag1 is 13 V, for example, but is not limited to this value, and may be another voltage. When the first erase voltage apply operation Erase1 is performed, the voltage of the select gate lines SGD in the selected block BLK_sel may follow the voltage of the select gate line SGS. For example, the select gate lines SGD (e.g., the select gate lines SGD0 to SGD3 shown in FIG. 3) in the selected block BLK_sel may be increased from the voltage Vss at the time point T1 to the erase voltage Verag1 at the time point T1A. Between the time period between the time point T1A and the time point T2, the sequencer 27 may cause the voltage of the select gate lines SGD to be maintained at the erase voltage Verag1 to perform the first erase voltage apply operation Erase1. The same voltage Verag1 may be applied to the select gate line SGS and the select gate lines SGD, for example, to simplify the configuration of the voltage supply circuit 28. Alternatively, different voltages may be applied to the select gate line SGS and the select gate lines SGD, respectively, for example, depending on the characteristics of the select gate transistors ST1 and ST2.

When Erase1 is performed, the voltage of the word line WL in the unselected block BLK_usel may be stepped up or increased by the capacitive coupling with the source line SL. As a result, when Erase1 is performed, the voltage of the word line WL in the unselected block BLK_usel may be increased from the voltage Vss at the time point T1 to a voltage ~Vera1 substantially the same as the erase voltage Vera1 at the time point T1A. The voltage of the word line WL in the unselected block BLK_usel may be maintained at the voltage ~Vera1 between the time point T1A and the time point T2.

At the time point T1, the sequencer 27 may step up or increase the voltage of the signal line CG as the global word line from the voltage Vss to perform Erase1 operation. The voltage of the signal line CG may be increased to a voltage VE1 at the time point T1A. Between the time period between the time point T1A and the time point T2, the sequencer 27 may cause the voltage of the signal line CG to be maintained at the voltage VE1 to perform the first erase voltage apply operation Erase1. The voltage VE1 is 0.5 V, for example.

At the time point T1, the sequencer 27 may step up or increase the voltage of the block select signal BLKSEL in the selected block BLK_sel from the voltage Vss to perform Erase1 operation. The voltage of the block select signal BLKSEL may be increased to a voltage VGBST at the time point T1A. Between the time period between the time point T1A and the time point T2, the sequencer 27 may cause the voltage of the block select signal BLKSEL in the selected block BLK_sel to be maintained at the voltage VGBST to perform the first erase voltage apply operation Erase1. The voltage VGBST may be a high voltage for passing the voltage of the signal line CG to the word line WL in the selected block BLK_sel. The voltage supply circuit 28 may supply the voltage VGBST independently of supply of the voltage Vera 1. Alternatively, the voltage supply circuit 28 may supply the same voltage as both of the voltage VGBST and Vera 1 in order to reduce the number of the voltage adjustment circuit inside the voltage supply circuit 28.

At the time point T1, the voltage of the word line WL in the selected block BLK_sel can be stepped up or increased from the voltage Vss to perform Erase1 operation. The voltage of the word line WL can be stepped up or increased to the voltage VE1 at or before the time pointe T1A. Between the time period between the time point T1A and the time point T2, the sequencer 27 may cause the voltage of the word line WL in the selected block BLK_sel to be maintained at the voltage VE1 to perform the first erase voltage apply operation Erase1. As a result, the voltage of the word line WL in the selected block BLK_sel may be the same as the voltage of the signal line CG (e.g., 0.5 V).

When Erase1 is performed, the sequencer 27 may maintain the voltage of the block select signal BLKSEL in the unselected block BLK_usel at the voltage Vss.

Next, at the time point T2, the sequencer 27 may step down or decrease the voltage of the source line SL from the voltage Vera1. The voltage of the source line SL may be stepped down or decreased to the voltage Vss at a time point T3.

At the time point T2, the sequencer 27 may step down or decrease the voltage of the select gate line SGS from the voltage Verag1. The voltage of the select gate line SGS may be stepped down or decreased to the voltage Vss at the time pointe T3.

At the time point T2, the voltage of the word line WL in the unselected block BLK_usel may be stepped down by the capacitive coupling with the source line SL. The voltage of the word line WL in the unselected block BLK_usel may be stepped down or decreased to the voltage Vss at the time point T3.

At the time point T2, the sequencer 27 may step down or decrease the voltage of the signal line CG as the global word line from the voltage VEl The voltage of the signal line CG may be stepped down or decreased to the voltage Vss at the time point T3. After the time point T2 and before the time point T3, the voltage of the word line WL in the selected block BLK_sel may be stepped down or decreased from the voltage VE1, accordingly. The voltage of the word line WL may be stepped down or decreased to the voltage Vss at the time point T3.

At the time point T2, the sequencer 27 may step down or decrease the voltage of the block select signal BLKSEL in the selected block BLK_sel from the voltage VGBST. The voltage of the block select signal BLKSEL in the selected block BLK_sel may be stepped down or decreased to the voltage Vss at the time point T3.

When Erase1 is performed, the sequencer 27 may maintain the voltage of the block select signal BLKSEL in the unselected block BLK_usel at the voltage Vss. The first erase voltage apply operation (Erase1) may terminate in the foregoing manner.

(Erase Verify1, First Erase Verify Operation)

After "Erase1", the erase verify operation may be performed. For example, the sequencer 27 may perform a first erase verify operation (Erase verify1) at or after the time point T3. As described above, the sequencer 27 may perform "Erase verify1" for each of the string units SU, individually.

When Erase verify1 is performed, the sequencer 27 may step up or increase the block select signal BLKSEL in the selected block BLK_sel to a voltage during the read operation for the memory cell transistor MT, and determine whether all the string units SU in the selected block BLK have passed the Erase veirfy1 (or whether data stored by the string units SU in the selected block BLK is erased successfully). In response to determining that all the string units SU in the selected block BLK have passed the Erase veirfy1 (or data stored by the string units SU in the selected block BLK is erased successfully), the sequencer 27 may terminate the erase operation. In response to determining that not all the string units SU in the selected block BLK have passed the Erase verify1 (or data stored by one or more of the string units SU in the selected block BLK is not erased successfully), the sequencer 27 may continue the erase operation. For example, the sequencer 27 may perform a second erase voltage apply operation (Erase2), in response to determining that not all the string units SU in the selected block BLK have passed Erase veirfy1.

Erase2 may be performed in a similar to Erase1 except that when Erase2 is performed, the sequencer 27 may step up or increase the voltage of the source line SL from the voltage Vss to an erase voltage Vera2 (Vera1+$\Delta$V), the sequencer 27 may also step up or increase the voltage of the select gate line SGS from the voltage Vss to a voltage Verag2 (Verag1+$\Delta$V), the voltage of the bit lines BL may be stepped up or increased to the erase voltage Vera2 (Vera1+$\Delta$V) similarly to the source line SL, the voltage of the select gate lines SGD may be stepped up or increased to the voltage Verag2 (Verag1+$\Delta$V) similarly to the select gate line SGS, and the word line WL in the selected block may be floated to have a voltage ~Vera2 higher than the voltage ~Vera1. Thus, detailed description on duplicated portion thereof is omitted herein for the sake of brevity. The voltage increase amount $\Delta$V from the erase voltage Vera1 to the erase voltage Vera2 applied to the source line SL may be the same as the voltage increase amount $\Delta$V from the erase voltage Vera1 to the erase voltage Vera2 applied to the bit lines BL. Alternatively, different increase amounts may be applied to the source line SL and the bit lines BL, respectively. The voltage increase amount $\Delta$V from the voltage Verag1 to the voltage Verag2 applied to the select gate line SGS may be the same as the voltage increase amount $\Delta$V from the voltage Verag1 to the erase voltage Verag2 applied to the select gate lines SGD. Alternatively, different increase amounts may be applied to the select gate line SGS and the select gate lines SGD, respectively.

After Erase2, the sequencer 27 may perform a second erase verify operation (Erase verify2). The second erase verify operation (Erase verify2) may be the same as the first erase verify operation (Erase verify1). For example, in response to determining that all the string units SU in the selected block BLK have passed Erase verify2 (or data stored by the string units SU in the selected block BLK is erased successfully), the sequencer 27 may terminate the erase operation. On the other hand, in response to determining that not all the string units SU in the selected block BLK have passed Erase veirfy2 (or data stored by one or more of the string units SU in the selected block BLK is not erased successfully), the sequencer 27 may continue the erase operation. For example, the sequencer 27 may perform a third erase voltage apply operation (Erase3), in response to determining that not all the string units SU in the selected block BLK have passed Erase veirfy2.

In this manner, in the erase operation of the comparative example, the voltage of the block select signal BLKSEL in the unselected block BLK_usel may be the voltage Vss in the respective erase voltage apply operations. Thus, 0 V may be applied to the gate of the transistor TR_CG configured to function as the word line switch connected to the unselected block BLK_usel.

When an erase operation is performed, the voltage of the word line WL in the unselected block BLK_usel may be stepped up or increased to around the voltage Vera1, for example, by the capacitive coupling with the source line SL. When a leakage current occurs in the transistor TR_CG configured to function as the word line switch, erroneous erasure of data may occur in the unselected block BLK_usel. In one approach, by raising the voltage of the signal line CG to 0.5 V to apply to the source of the transistor TR_CG, the transistor TR_CG can be reliably turned off to prevent erroneous erasure of data in the unselected block BLK_usel.

However, increasing the voltage of the signal line CG may lower the effectiveness of the erase operation. For example, when the voltage of the signal line CG is raised to 0.5 V, the voltage of the word line WL in the selected block BLK_sel may also rise to 0.5 V. In one aspect, data erasure in the memory cell transistor may be performed by a voltage difference between the word line WL and a channel. Hence, if the voltage of the word line WL is increased, then the effectiveness of the erase operation may be reduced. To avoid reduction in the erase performance due to the increase in the word line WL, the voltage Vera1, which is an erase voltage, may be raised, for example, by 0.5 V, accordingly. However, increasing the voltage Vera1 may cause increased power consumption. In addition, when the voltage Vera1 rises, a withstand voltage of the transistor may be raised, resulting in an increased circuit scale.

2-2. Erase Operation According to Present Embodiment

Figure 12:
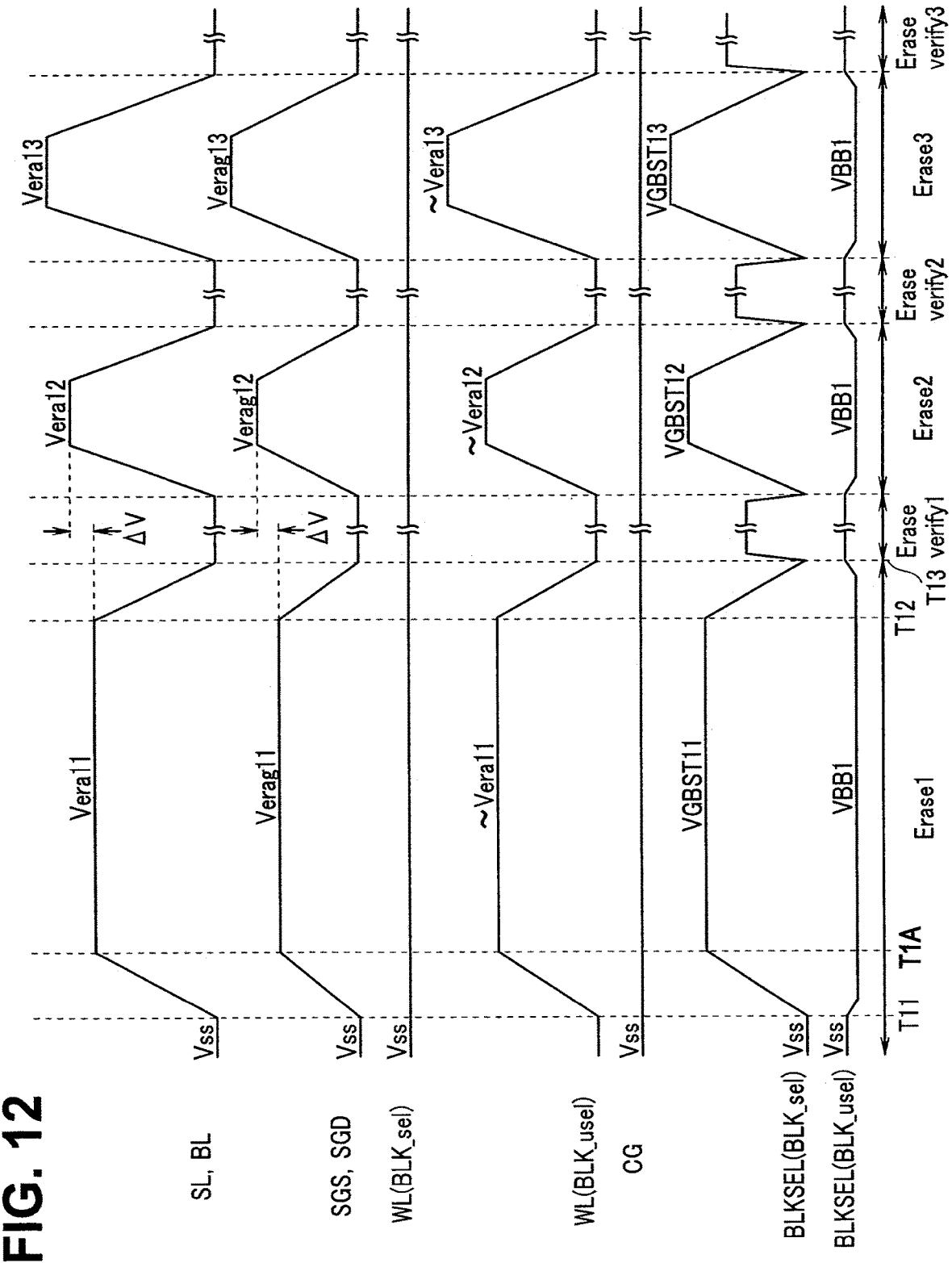
FIG. 12 is a waveform diagram showing an example of voltages for an erase operation, according to some embodiments.

Next, an erase operation according to some embodiments is described with reference to FIG. 12. FIG. 12 is a waveform diagram showing an example of voltages of respective wirings during the erase operation according to some embodiments. The waveform diagram in FIG. 12 is similar to the waveform diagram in FIG. 11, except that when erase voltage apply operations Erase1, Erase2, Erase3 are performed: i) a voltage VBB1 instead of a voltage Vss can be applied to the block select signal BLKSEL in the unselected block BLK_usel, ii) erase voltages Vera11, Vera12, Vera13 instead of erase voltages Vera1, Vera2, Vera3 can be applied to the source line SL and the bit lines BL, iii) erase voltages Verag11, Verag12, Verag13 instead of erase voltages Verag1, Verag2, Verag3 can be applied to the select gate lines SGS, SGD, iv) the word line WL of the unselected block BLK_usel can be floated to have voltages ~Vera11, ~Vera12, ~Vera13 instead of voltages ~Vera1, ~Vera2, ~Vera3, v) a voltage Vss instead of a voltage VE1 can be applied to the word line of the selected block (BLK_sel) and the signal line CG, and vi) high power supply voltages VGBST11, VGBST12, VGBST13, instead of high power supply voltage VGBST1, VGBST2, VGBST3 can be applied to the block select signal BLKSEL in the selected block BLK_sel. Thus, detailed description on duplicated portion thereof is omitted herein for the sake of brevity.

As shown in FIG. 12, in some embodiments, a voltage VBB1 which is a negative voltage generated in the block decoder 25B may be supplied to the block select signal BLKSEL in the unselected block BLK_usel in the respective erase voltage apply operations. The voltage VBB1 is −0.5 V (a first negative voltage), for example.

When an erase voltage apply operation is performed, the sequencer 27 may apply the voltage Vss (e.g., 0 V) to the signal line CG, instead of the voltage VE1. By applying a negative voltage of −0.5 V, for example, as the block select signal BLKSEL in the unselected block BLK_usel, leakage current in the transistor TR_CG may be reduced or obviated even when the voltage Vss of 0 V is applied to the signal line CG.

When the voltage Vss of 0 V is applied to the signal line CG, the voltage supplied to the word line WL in the selected block BLK_sel may become the voltage Vss of 0 V.

In one aspect, the erase voltage Vera11 (e.g., 19.5 V) lower than the erase voltage Vera1 can be applied to the source line SL for the Erase1 operation. In addition, the erase voltage Vera11 lower than the erase voltage Vera1 can be applied to the bit lines BL for the Erase1 operation.

Similarly, an erase voltage Verag11 lower than the erase voltage Verag1 can be applied to the select gate lines SGS, SGD for the Erase1 operation.

In this manner, in some embodiments, the voltage VBB1, which is a negative voltage, can be applied as the block select signal BLKSEL in the unselected block BLK_usel during the erase voltage apply operation to achieve various advantages. For example, the voltage VE1 applied to the signal line CG, the erase voltage Verag11 applied to the select gate line SGS, the erase voltage Vera11 applied to the source line SL, and the like can be reduced by applying the voltage VBB1 or a negative voltage. Since the erase voltage Vera11 can be reduced, a load on the voltage supply circuit 28 can be reduced, such that power consumption of the nonvolatile memory 2 can be greatly reduced. Moreover, by applying the voltage VBB1 or a negative voltage, the nonvolatile memory 2 can be implemented in an area efficient manner. For example, the voltage supply circuit 28 may include a charge pump circuit to generate a voltage higher than the power supply voltage VCC (or a power supply voltage VPP) to perform an erase operation. In general, a size or an area of the charge pump circuit may increase, as a higher voltage is produced by the charge pump circuit. In some embodiments, the charge pump circuit included in the voltage supply circuit 28 can be reduced in size by reducing a value of a voltage for performing an erase operation, to achieve area efficiency.

In one aspect, a withstand voltage transistor for preventing a high voltage (an erase voltage Vera) from being supplied from the bit lines BL to the sense amplifier 24 during the erase voltage apply operation can be provided between the bit lines BL and the sense amplifier 24. Since the erase voltage Vera can be reduced, the withstand voltage transistor can be reduced in size, and the nonvolatile memory 2 can achieve area efficiency.

At power shutdown, for example, when power is suddenly lost in the nonvolatile memory 2, the internal voltages may be rapidly discharged in order for safe shutdown. When the erase voltage apply operation is being performed, for example, the erase voltage Vera may be rapidly discharged at power shutdown. Since the erase voltage Vera can be lowered, a discharge time period at power shutdown can be shortened.

Since the erase voltage Vera can be lowered, the charge pump circuit in the voltage supply circuit 28 configured to generate the erase voltage Vera can be reduced in consumption power and circuit area.

In some embodiments, different voltages may be applied to different word lines during an erase voltage apply operation. For example, a physical position and a configuration (the number of layers and thickness) may vary among the word lines WL. The voltage to be applied may be adjusted for each of the word lines WL so as to accommodate differences in physical position and configuration among the word lines WL, for example.

In some embodiments, a voltage of –0.5 V may be applied to the gate of the transistor TR_CG configured to function as the word line switch, a voltage of 0 V may be applied to the source, and a voltage of 19.5 V may be applied to the drain. In some embodiments, a voltage of –0.5 V may be also applied to the substrate. However, the voltage applied to the substrate may not be limited to –0.5 V. When a voltage of –3 V is applied to the substrate, for example, a threshold value Vth of the transistor TR_CG may increase through back biasing. Thus, the voltage applied to the gate can be raised to –0.4 V, for example. This may cause reduce margin for a substrate-drain withstand voltage, but may increase a margin for a gate-drain withstand voltage.

Since the threshold value Vth of the transistor TR_CG drops through back biasing when a voltage of 0 V is applied to the substrate, for example, the voltage applied to the gate may be reduced to –0.6 V, for example. In this case, the margin for the gate-drain withstand voltage may be decreased, but the margin for the substrate-drain withstand voltage can be increased. For example, the voltage applied to the substrate can be changed as appropriate so as to increase the margin for the gate-drain withstand voltage of the transistor TR_CG or so as to increase the margin for the substrate-drain withstand voltage.

After the Erase1 is performed, Erase verify1 can be performed as described above with respect to FIG. 10. For example, the sequencer 27 may step up or increase the block select signal BLKSEL in the selected block BLK_sel to a voltage during the read operation for the memory cell transistor MT. In response to determining that all the string units SU in the selected block BLK have passed the Erase veirfy1 (or data stored by the string units SU in the selected block BLK is erased successfully), the sequencer 27 may terminate the erase operation. In response to determining that not all the string units SU in the selected block BLK have passed the Erase verify1 (or data stored by one or more of the string units SU in the selected block BLK is not erased successfully), the sequencer 27 may continue the erase operation. For example, the sequencer 27 may perform a second erase voltage apply operation (Erase2), in response to determining that not all the string units SU in the selected block BLK have passed Erase veirfy1.

Figure 13:
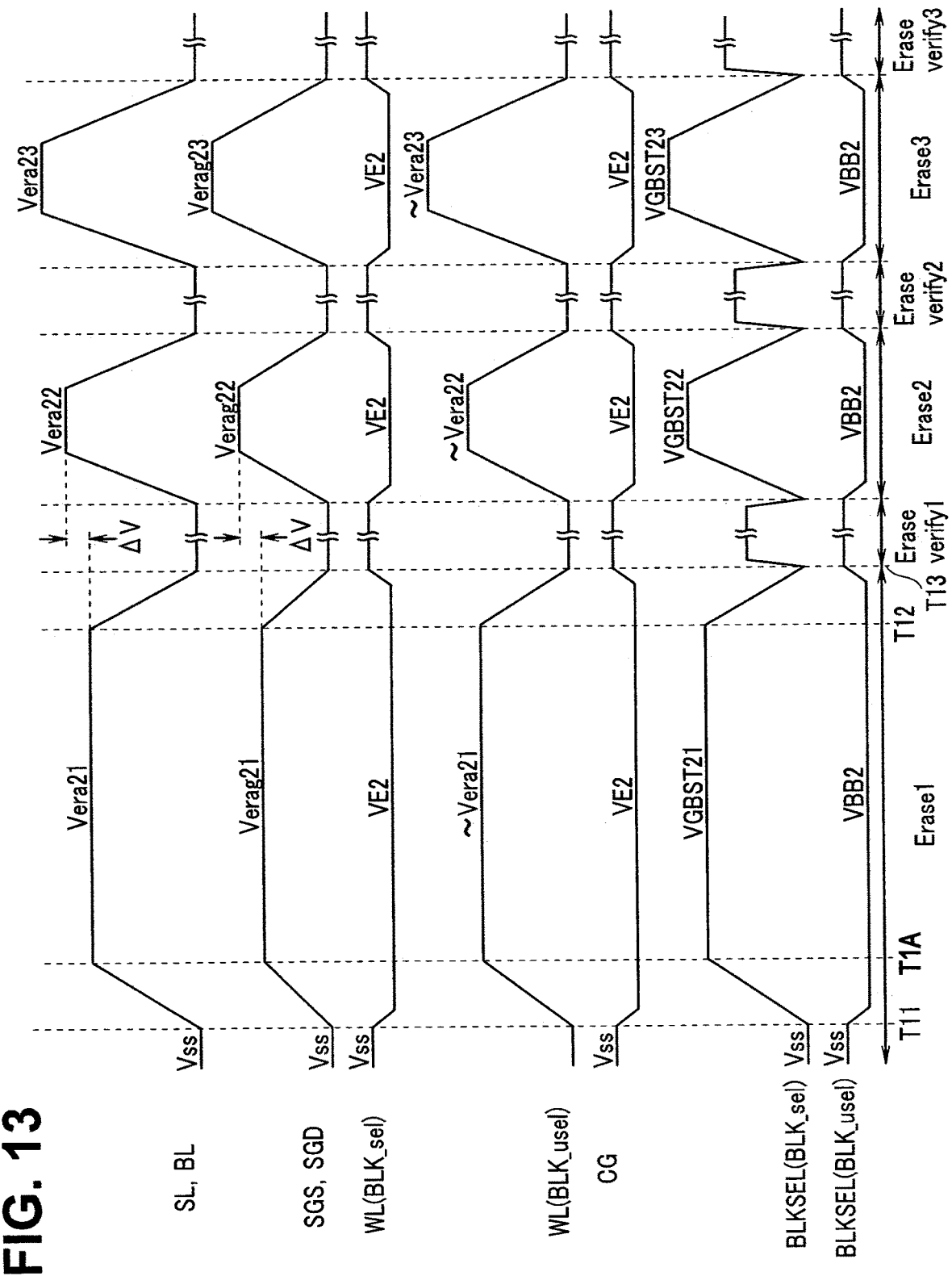
FIG. 13 is a waveform diagram showing an example of voltages for an erase operation, according to some embodiments.

FIG. 13 is a waveform diagram showing an example of voltages of respective wirings during an erase operation according to some embodiments. The waveform diagram in FIG. 13 is similar to the waveform diagram in FIG. 12, except that when erase voltage apply operations Erase1, Erase2, Erase3 are performed: i) a voltage VBB2 instead of a voltage VBB1 can be applied to the block select signal BLKSEL in the unselected block BLK_usel, ii) erase voltages Vera21, Vera22, Vera23 instead of erase voltages Vera11, Vera12, Vera13 can be applied to the source line SL and the bit lines BL, iii) erase voltages Verag21, Verag22, Verag23 instead of erase voltages Verag11, Verag12, Verag13 can be applied to the select gate lines SGS, SGD, iv) the word line WL of the unselected block BLK_usel can be floated to have voltages ~Vera21, ~Vera22, ~Vera23 instead of voltages ~Vera11, ~Vera12, ~Vera13, v) a voltage VE2 (e.g., negative voltage) instead of a voltage Vss can be applied to the word line of the selected block (BLK_sel) and the signal line CG, and vi) high power supply voltages VGBST21, VGBST22, VGBST23, instead of high power supply voltages VGBST11, VGBST12, VGBST13 can be applied to the block select signal BLKSEL in the selected block BLK_sel. Thus, detailed description on duplicated portion thereof is omitted herein for the sake of brevity.

As shown in FIG. 13, in some embodiments, in the respective erase voltage apply operations, a voltage VBB2 which is a negative voltage generated by the block decoder 25B may be supplied to the block select signal BLKSEL in the unselected block BLK_usel. The voltage VBB2 may be lower than the voltage VBB1, for example by 3V.

For an erase voltage apply operation, the sequencer 27 may apply a voltage VE2, which may be a negative voltage, to the signal line CG. The voltage VE2 may be –2.5 V, for example. For example, a negative voltage (e.g., –3 V), instead of the voltage Vss (e.g., 0 V) may be applied as the block select signal BLKSEL in the unselected block BLK_usel. Thus, a leakage current in the transistor TR_CG may be reduced or obviated, even when the voltage VE2 of –2.5 V may be applied to the signal line CG.

Since the voltage VE2, which is a negative voltage, is applied to the signal line CG for an erase voltage apply operation, the voltage supplied to the selected block BLK_sel may also become the voltage VE2, which is a negative voltage.

For example, an erase voltage Vera21 applied to the source line SL can be reduced by 3 V from the erase voltage Vera11. When applying an erase voltage to the bit lines BL similarly to the source line SL, the erase voltage Vera21 applied to the bit lines BL can be reduced by 3 V from the erase voltage Vera11.

An erase voltage Verag21 of the select gate line SGS can be reduced by 3 V from the erase voltage Verag11. The erase voltage Verag21 can be also applied to the select gate lines SGD similarly to the select gate line SGS.

Accordingly, the voltage VBB2 which is a negative voltage lower than the voltage VBB1 can be applied as the block select signal BLKSEL in the unselected block BLK_usel during the erase voltage apply operation. As a result, the erase voltage Verag21 applied to the select gate line SGS, the erase voltage Vera21 applied to the source line SL, and the like can be reduced.

As a result, by applying the voltage VBB2 lower than the voltage VBB1 to the BLKSEL in the unselected block BLK_usel, the power consumption of the nonvolatile memory 2 can be reduced further.

Figure 14:
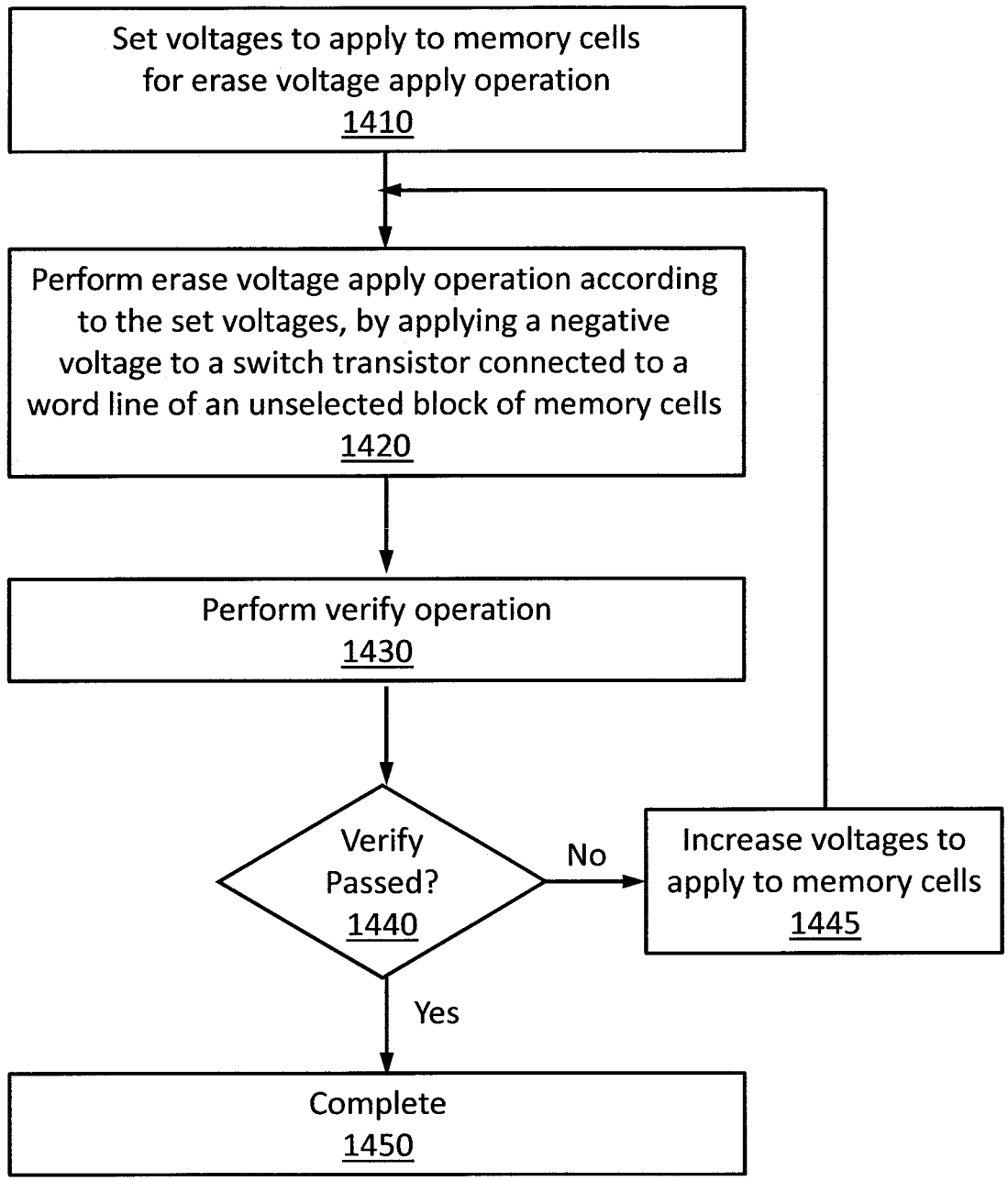
FIG. 14 is a flow chart showing an example process of performing an erase operation, according to some embodiments.

FIG. 14 is a flow chart showing an example process of performing an erase operation, according to some embodiments. In some embodiments, the process shown in FIG. 14 is performed by various components of the nonvolatile memory 2 (e.g., the sequencer 27). In some embodiments, the process shown in FIG. 14 is performed by the memory controller 1 or other entities. In some embodiments, the process shown in FIG. 14 can include more, fewer, or different steps than shown in FIG. 14.

In one approach, the sequencer 27 sets 1410 voltages to apply to memory cells for an erase voltage apply operation. For example, the sequencer 27 may select or determine an erase voltage (e.g., Vera11 or Vera21) to apply to source lines and bit lines BL. For example, the sequencer 27 may select or determine an erase voltage (e.g., Verag11 or Verag21) to apply to select gate lines SGS, SGD. For example, the sequencer 27 may select or determine a high supply voltage (e.g., VGBST1 or VGBST2) to apply to gates of switch transistors in a switch circuit group (e.g., switch circuit group 25B) of a selected block BLK_sel.

In one approach, the sequencer 27 performs 1420 an erase voltage apply operation according to the set voltages. For example, the sequencer 27 may perform, during a time period, the erase voltage apply operation by causing the row decoder 25 to apply a negative voltage (e.g., VBB1 or VBB2) to gates of switch transistors in a switch circuit group (e.g., switch circuit group 25B) connected to an unselected block BLK_usel, while applying the selected high supply voltage (e.g., VGBST11 or VGBST21) to gates of switch transistors in a switch circuit group (e.g., switch circuit group 25A) connected to a selected block BLK_sel. Accordingly, during the time period, switch transistors in a switch circuit group (e.g., switch circuit group 25B) connected to an unselected block BLK_usel may be disabled (or turned off), while switch transistors in a switch circuit group (e.g., switch circuit group 25B) connected to a selected block BLK_sel may be enabled (or turned on). For example, the sequencer 27 may cause the voltage supply circuit 28 to apply the selected erase voltage (e.g., Verag11 or Verag21) to select gate lines SGS, SGD in the selected block BLK_sel through the enabled switch transistors during the time period. For example, the sequencer 27 may cause the voltage supply circuit 28 to apply a voltage Vss (or 0V) or a negative voltage VE2 to a word line WL in a selected block BLK_sel through the enabled switch transistors during the time period. During the time period, the word line WL in an unselected block BLK_usel may be electrically floated to have a voltage ~Vera11 or ~Vera21. For example, the sequencer 27 may cause the sense amplifier 24 to apply the selected erase voltage (e.g., Vera11 or Vera21) to source lines and/or bit lines BL during the time period. In response to various voltages applied during the time period for the erase voltage apply operation, data stored by memory cells in a selected block may be erased, while data stored by memory cells in an unselected block may not be erased.

In one approach, the sequencer 27 performs 1430 an erase verify operation, and determines 1440 whether the erase verify operation is passed or not. For example, the sequencer 27 may read data for each string unit SU, and may determine whether all the string units SU in the selected block BLK have passed the Erase veirfy1 (or whether data stored by the string units SU in the selected block BLK is erased successfully).

In response to determining that not all the string units SU in the selected block BLK have passed the erase verify operation (or data stored by one or more of the string units SU in the selected block BLK is not erased successfully), the sequencer 27 may increase 1445 voltages to apply to memory cells. For example, the sequencer 27 may select or determine an erase voltage (e.g., Vera12, Vera22) with a higher value to apply to a source line SL and a bit line BL. For example, the sequencer 27 may select or determine an erase voltage (e.g., Verag12, Verag22) with a higher value to apply to select gate lines SGS, SGD. For example, the sequencer 27 may select or determine a high supply voltage (e.g., VGBST11, VGBST21) with a higher value to apply to the block select signal BLKSEL. According to the selected voltages, the sequencer 27 may proceed to the step 1420.

In response to determining that all the string units SU in the selected block BLK have passed the erase verify operation (or data stored by the string units SU in the selected block BLK is erased successfully), the sequencer 27 may complete 1450 the erase operation.

Various embodiments disclosed herein are related to a device for storing data. In some embodiments, the device includes a first block of memory cells and a second block of memory cells. In some embodiments, the device includes a first word line connected to gates of the first block of memory cells. In some embodiments, the device includes a second word line connected to gates of the second block of memory cells. In some embodiments, the device includes a first switch transistor connected to the first word line. In some embodiments, the device includes a second switch transistor connected to the second word line. In some embodiments, the device includes a voltage supply circuit connected to the first switch transistor and the second switch transistor. In some embodiments, the voltage supply circuit is configured to apply, during a first time period, a first voltage to a gate of the first switch transistor to enable the first switch transistor. In some embodiments, the voltage supply circuit is configured to apply, during the first time period, a second voltage lower than the first voltage to the first word line through the first switch transistor. In some embodiments, the voltage supply circuit is configured to apply, during the first time period, a third voltage lower than the second voltage to a gate of the second switch transistor to disable the second switch transistor.

In some embodiments, the voltage supply circuit is configured to apply, during the first time period, i) the first voltage to the gate of the first switch transistor, and ii) the second voltage to the first word line, to erase data stored by the first block of memory cells.

In some embodiments, data stored by the second block of memory cells is not erased during the first time period.

In some embodiments, the third voltage is a negative voltage lower than a ground voltage.

In some embodiments, the second voltage is the ground voltage.

In some embodiments, the second voltage is another negative voltage lower than the ground voltage.

In some embodiments, during the first time period, the second word line is electrically floated to have a fourth voltage higher than the second voltage.

In some embodiments, the voltage supply circuit is configured to apply, during a second time period before the first time period, the second voltage to i) the gate of the first switch transistor, and ii) the gate of the second switch transistor.

In some embodiments, the device further includes a first line connected to the voltage supply circuit. The first switch transistor may be connected between the first line and the first word line. The second switch transistor may be connected between the first line and the second word line. In some embodiments, the voltage supply circuit is configured to apply, during the first time period, the second voltage to the first word line through the first line and the first switch transistor.

In some embodiments, the voltage supply circuit is configured to apply, during a second time period before the first time period, the second voltage to i) the gate of the first switch transistor, ii) the gate of the second switch transistor, and iii) the first line.

In some embodiments, the voltage supply circuit is configured to apply, during a second time period before the first time period, a fourth voltage to i) the gate of the first switch transistor, and ii) the gate of the second switch transistor, and iii) the first line. In some embodiments, the fourth voltage is between the first voltage and the second voltage.

In some embodiments, a portion of the first block of memory cells is connected between a bit line and a source line. In some embodiments, a portion of the second block of memory cells is connected between the bit line and the source line. In some embodiments, the bit line and the source line are applied with a fourth voltage higher than the second voltage during the first time period.

In some embodiments, the voltage supply circuit is configured to apply, during a second time period after the first time period, a fourth voltage higher than the first voltage to the gate of the first switch transistor to enable the first switch transistor. In some embodiments, the voltage supply circuit is configured to apply, during the second time period, the second voltage to the first word line through the first switch transistor. In some embodiments, the voltage supply circuit is configured to apply, during the second time period, the third voltage to the gate of the second switch transistor to disable the second switch transistor.

Various embodiments disclosed herein are related to a memory device. In some embodiments, the memory device includes a first plurality of memory cells and a second plurality of memory cells. In some embodiments, the memory device includes a first word line connected to gates of the first plurality of memory cells. In some embodiments, the memory device includes a second word line connected to gates of the second plurality of memory cells. In some embodiments, the memory device includes a first switch transistor connected to the first word line. In some embodiments, the memory device includes a second switch transistor connected to the second word line. In some embodiments, the memory device includes a voltage supply circuit connected to the first switch transistor and the second switch transistor. In some embodiments, to erase data stored by the first plurality of memory cells, the voltage supply circuit is configured to: i) apply, during a first time period, a first voltage to a gate of the first switch transistor to enable the first switch transistor, ii) apply, during the first time period, a second voltage lower than the first voltage to the first word line through the first switch transistor, and iii) apply, during the first time period, a third voltage lower than the second voltage to a gate of the second switch transistor to disable the second switch transistor.

In some embodiments, the third voltage is a negative voltage lower than a ground voltage.

In some embodiments, the second voltage is the ground voltage.

In some embodiments, the second voltage is another negative voltage lower than the ground voltage.

In some embodiments, during the first time period, the second word line is electrically floated to have a fourth voltage higher than the second voltage.

Various embodiments disclosed herein are related to a method of operating a memory device. In some embodiments, the memory device includes applying, by a voltage supply circuit during a first time period, a first voltage to a gate of a first switch transistor to enable the first switch transistor. The first switch transistor may be connected to a first block of memory cells. In some embodiments, the method includes applying, by the voltage supply circuit during the first time period, a second voltage lower than the first voltage to a first word line through the first switch transistor. The first word line may be connected to gates of the first block of memory cells. In some embodiments, the method includes applying, by the voltage supply circuit during the first time period, a third voltage lower than the second voltage to a gate of a second switch transistor to disable the second switch transistor. The second switch transistor may be connected to a second block of memory cells. In some embodiments, during the first time period, i) the first voltage is applied to the gate of the first switch transistor, and ii) the second voltage is applied to the first word line, to erase data stored by the first block of memory cells.

In some embodiments, a second word line coupled to gates of the second block of memory cells is electrically floated to have a fourth voltage higher than the second voltage. In some embodiments, data stored by the second block of memory cells is not erased during the first time period.

In some embodiments, the third voltage is a negative voltage lower than a ground voltage.

In some embodiments, the second voltage is the ground voltage.

In some embodiments, the second voltage is another negative voltage lower than the ground voltage.

In some embodiments, the method includes applying, during a second time period before the first time period, the second voltage to i) the gate of the first switch transistor, and ii) the gate of the second switch transistor.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A device comprising:
a first block of memory cells;
a second block of memory cells;
a first word line connected to gates of the first block of memory cells;
a second word line connected to gates of the second block of memory cells;
a first switch transistor connected to the first word line;
a second switch transistor connected to the second word line;
a voltage supply circuit connected to the first switch transistor and the second switch transistor, the voltage supply circuit configured to:
 apply, during a first time period, a first voltage to a gate of the first switch transistor to enable the first switch transistor,
 apply, during the first time period, a second voltage lower than the first voltage to the first word line through the first switch transistor, and
 apply, during the first time period, a third voltage lower than the second voltage to a gate of the second switch transistor to disable the second switch transistor; and
a first line connected to the voltage supply circuit,
wherein the first switch transistor is connected between the first line and the first word line,
wherein the second switch transistor is connected between the first line and the second word line,
wherein the voltage supply circuit is configured to
 apply, during the first time period, the second voltage to the first word line through the first line and the first switch transistor, and
 apply, during a second time period before the first time period, a fourth voltage to
  i) the gate of the first switch transistor,
  ii) the gate of the second switch transistor, and
  iii) the first line, and
wherein the fourth voltage is between the first voltage and the second voltage.

2. The device of claim 1, wherein the voltage supply circuit is configured to apply, during the first time period, i) the first voltage to the gate of the first switch transistor, and ii) the second voltage to the first word line, to erase data stored by the first block of memory cells.

3. The device of claim 2, wherein data stored by the second block of memory cells is not erased during the first time period.

4. The device of claim 1, wherein the third voltage is a negative voltage lower than a ground voltage.

5. The device of claim 4, wherein the second voltage is the ground voltage.

6. The device of claim 4, wherein the second voltage is another negative voltage lower than the ground voltage.

7. The device of claim 1, wherein, during the first time period, the second word line is electrically floated to have a fourth voltage higher than the second voltage.

8. The device of claim 1, wherein the voltage supply circuit is configured to:
apply, during a second time period before the first time period, the second voltage to i) the gate of the first switch transistor, and ii) the gate of the second switch transistor.

9. The device of claim 1,
wherein a portion of the first block of memory cells is connected between a bit line and a source line,
wherein a portion of the second block of memory cells is connected between the bit line and the source line, and
wherein the bit line and the source line are applied with a fifth voltage higher than the second voltage during the first time period.

10. The device of claim 1, wherein the voltage supply circuit is configured to:
apply, during a third time period after the first time period, a sixth voltage higher than the first voltage to the gate of the first switch transistor to enable the first switch transistor,
apply, during the third time period, the second voltage to the first word line through the first switch transistor, and
apply, during the third time period, the third voltage to the gate of the second switch transistor to disable the second switch transistor.

11. A memory device comprising:
a first plurality of memory cells;
a second plurality of memory cells;
a first word line connected to gates of the first plurality of memory cells;
a second word line connected to gates of the second plurality of memory cells;
a first switch transistor connected to the first word line;
a second switch transistor connected to the second word line;
a voltage supply circuit connected to the first switch transistor and the second switch transistor; and
a first line connected to the voltage supply circuit,
wherein, to erase data stored by the first plurality of memory cells, the voltage supply circuit is configured to:
apply, during a first time period, a first voltage to a gate of the first switch transistor to enable the first switch transistor,
apply, during the first time period, a second voltage lower than the first voltage to the first word line through the first switch transistor, and
apply, during the first time period, a third voltage lower than the second voltage to a gate of the second switch transistor to disable the second switch transistor,
wherein the first switch transistor is connected between the first line and the first word line,
wherein the second switch transistor is connected between the first line and the second word line,
wherein the voltage supply circuit is configured to
apply, during the first time period, the second voltage to the first word line through the first line and the first switch transistor, and
apply, during a second time period before the first time period, a fourth voltage to
i) the gate of the first switch transistor,
ii) the gate of the second switch transistor, and
iii) the first line, and
wherein the fourth voltage is between the first voltage and the second voltage.

12. The memory device of claim 11, wherein the third voltage is a negative voltage lower than a ground voltage.

13. The memory device of claim 12, wherein the second voltage is the ground voltage.

14. The memory device of claim 12, wherein the second voltage is another negative voltage lower than the ground voltage.

15. The memory device of claim 11, wherein, during the first time period, the second word line is electrically floated to have a fourth voltage higher than the second voltage.

16. A method comprising:
applying, by a voltage supply circuit during a first time period, a first voltage to a gate of a first switch transistor to enable the first switch transistor, the first switch transistor connected to a first block of memory cells;
applying, by the voltage supply circuit during the first time period, a second voltage lower than the first voltage to a first word line through the first switch transistor, the first word line connected to gates of the first block of memory cells;
applying, by the voltage supply circuit during the first time period, a third voltage lower than the second voltage to a gate of a second switch transistor to disable the second switch transistor, the second switch transistor connected to a second block of memory cells; and
connecting a first line to the voltage supply circuit,
wherein, during the first time period, i) the first voltage is applied to the gate of the first switch transistor, and ii) the second voltage is applied to the first word line, to erase data stored by the first block of memory cells,
wherein the first switch transistor is connected between the first line and the first word line, and wherein the second switch transistor is connected between the first line and a second word line,
wherein the voltage supply circuit is configured to
apply, during the first time period, the second voltage to the first word line through the first line and the first switch transistor, and
apply, during a second time period before the first time period, a fourth voltage to
i) the gate of the first switch transistor,
ii) the gate of the second switch transistor, and
iii) the first line, and
wherein the fourth voltage is between the first voltage and the second voltage.

17. The method of claim 16,
wherein the second word line is coupled to gates of the second block of memory cells and is electrically floated to have a fourth voltage higher than the second voltage, and
wherein data stored by the second block of memory cells is not erased during the first time period.

* * * * *